United States Patent
Ogawa

(10) Patent No.: US 10,402,114 B2
(45) Date of Patent: Sep. 3, 2019

(54) INFORMATION PROCESSING SYSTEM, STORAGE CONTROL APPARATUS, STORAGE CONTROL METHOD, AND STORAGE CONTROL PROGRAM

(71) Applicant: NEC CORPORATION, Tokyo (JP)

(72) Inventor: Shugo Ogawa, Tokyo (JP)

(73) Assignee: NEC CORPORATION, Minato, Tokyo (JP)

( * ) Notice: Subject to any disclaimer, the term of this patent is extended or adjusted under 35 U.S.C. 154(b) by 0 days.

(21) Appl. No.: 15/742,176

(22) PCT Filed: Jun. 3, 2016

(86) PCT No.: PCT/JP2016/066684
§ 371 (c)(1),
(2) Date: Jan. 5, 2018

(87) PCT Pub. No.: WO2017/006674
PCT Pub. Date: Jan. 12, 2017

(65) Prior Publication Data
US 2018/0196619 A1   Jul. 12, 2018

(30) Foreign Application Priority Data

Jul. 6, 2015   (JP) .................. 2015-135002

(51) Int. Cl.
*G06F 3/06* (2006.01)
*G06F 12/00* (2006.01)
*G06F 12/10* (2016.01)

(52) U.S. Cl.
CPC ............ *G06F 3/0647* (2013.01); *G06F 3/061* (2013.01); *G06F 3/0604* (2013.01); *G06F 3/064* (2013.01);
(Continued)

(58) Field of Classification Search
CPC .... G06F 3/0647; G06F 3/0604; G06F 3/0611; G06F 3/0673; G06F 12/10; G06F 3/06;
(Continued)

(56) References Cited

U.S. PATENT DOCUMENTS

| | | |
|---|---|---|
| 5,937,425 A | 8/1999 | Ban |
| 2005/0021900 A1 | 1/2005 | Okuyama et al. |
| 2005/0216665 A1* | 9/2005 | Takakuwa ............ G06F 3/0613 711/114 |
| 2010/0228905 A1 | 9/2010 | Honda |
| 2012/0303916 A1 | 11/2012 | Reed et al. |
| 2012/0303918 A1 | 11/2012 | Reed et al. |

(Continued)

FOREIGN PATENT DOCUMENTS

| | | |
|---|---|---|
| JP | 2004-334419 A | 11/2004 |
| JP | 2008-198102 A | 8/2008 |

(Continued)

OTHER PUBLICATIONS

Jeong-Uk Kang et al. "The Multi-streamed Solid-State Drive", 6th USENIX Workshop on Hot Topics in Storage and File Systems (HotStorage), 2014, 5 pages.

(Continued)

*Primary Examiner* — Hua J Song
(74) *Attorney, Agent, or Firm* — Sughrue Mion, PLLC

(57) ABSTRACT

There is provided a storage control apparatus for improving the access performance of a storage medium and prolonging the life of the storage medium while suppressing an increase in fragmentation and a delay in normal write processing by avoiding frequent occurrence of rearrangement processing. This storage control apparatus includes a fragmentation evaluator that evaluates a degree to which data corresponding to a logical address area in a logical address space used by a host computer to access the storage medium is fragmented and stored in a plurality of physical address areas in
(Continued)

a physical address space used in the storage medium, a timing selector that selects a timing of performing evaluation by the fragmentation evaluator, and a rearrangement instructor that instructs execution of data rearrangement processing of rearranging the data corresponding to the logical address area to be written in continuous physical address areas in the storage medium, based on the degree evaluated by the fragmentation evaluator at the timing.

20 Claims, 25 Drawing Sheets

(52) U.S. Cl.
CPC .......... *G06F 3/0611* (2013.01); *G06F 3/0616* (2013.01); *G06F 3/0673* (2013.01); *G06F 3/0679* (2013.01); *G06F 12/00* (2013.01); *G06F 12/10* (2013.01); *G06F 2212/1024* (2013.01); *G06F 2212/1044* (2013.01); *G06F 2212/657* (2013.01)

(58) Field of Classification Search
CPC ..... G06F 2212/1044; G06F 2212/1024; G06F 12/00

USPC ........................................................ 711/165
See application file for complete search history.

(56) References Cited

U.S. PATENT DOCUMENTS

| | | | |
|---|---|---|---|
| 2014/0281132 A1* | 9/2014 | Bundukin | ........... G06F 12/0246 711/103 |
| 2014/0289449 A1 | 9/2014 | Ogata | |
| 2015/0220552 A1* | 8/2015 | Duzly | ................... G06F 3/0688 707/693 |

FOREIGN PATENT DOCUMENTS

| | | |
|---|---|---|
| JP | 2014-517971 A | 7/2014 |
| JP | 5550741 B1 | 7/2014 |
| WO | 2009/013877 A1 | 1/2009 |

OTHER PUBLICATIONS

International Search Report for PCT/JP2016/066684, dated Jul. 12, 2016.

* cited by examiner

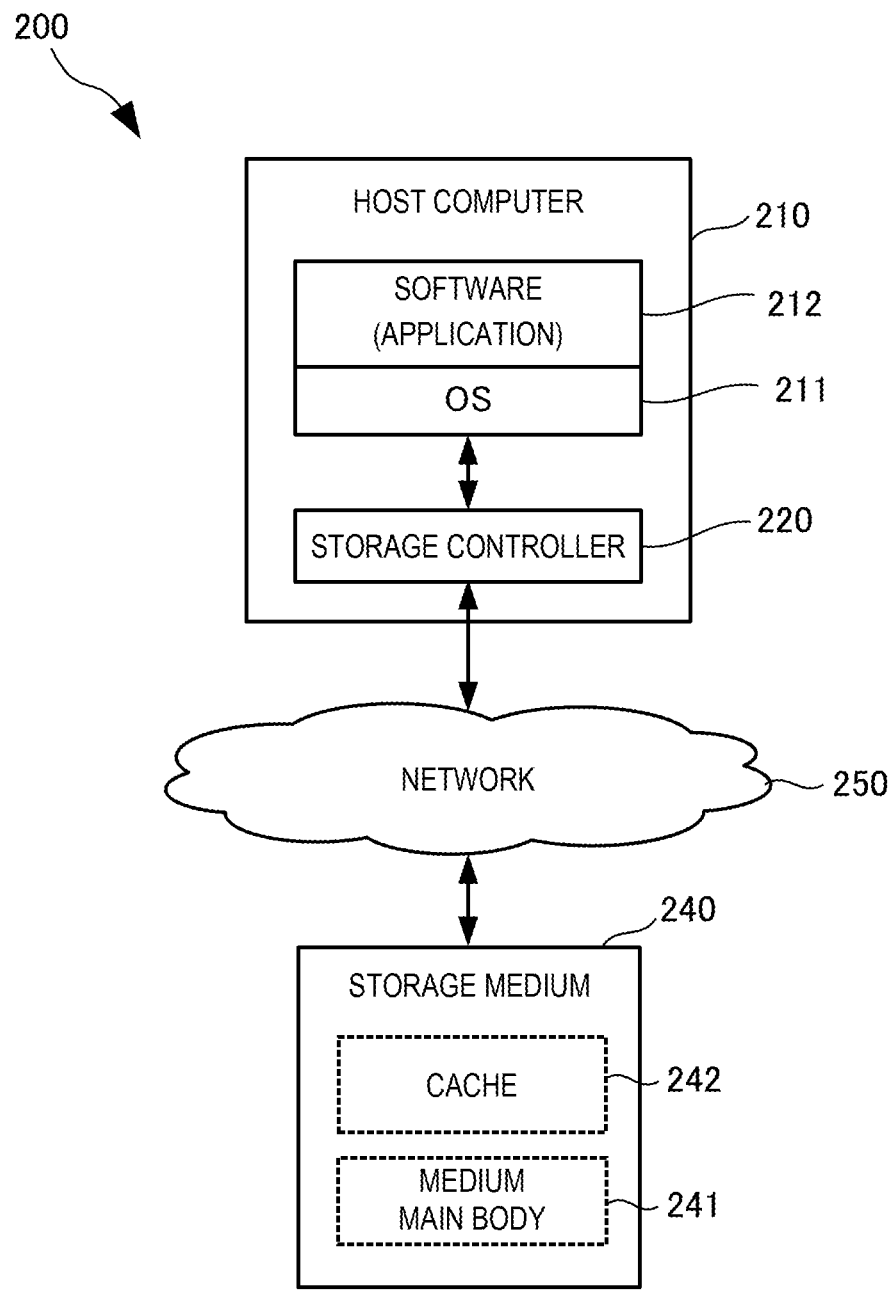
F I G. 2

FIG. 4B

UPDATE HISTORY MANAGEMENT TABLE — 305

| DATA IDENTIFIER | STORING END FLAG | LAST UPDATE TIME |
|---|---|---|
| /home/user1/a.dat | 0 | 12:34:56.789 |
| /var/log/b.log | 1 | 12:33:00.000 |
| /home/user2/c.csv | 0 | 12:34:56.901 |
| ... | ... | ... |

431, 432, 433

| 451 | 452 | 453 | 454 | 455 |
|---|---|---|---|---|
| DATA IDENTIFIER | STORING END FLAG | DATA SIZE (D) | MIXED DATA SIZE (M) | INDEX VALUE {α = M/(D + M)} REPRESENTING DEGREE OF FRAGMENTATION |
| /var/log/b.log | 1 | 20480KB | 25600KB | 0.56 |

| 461 | 462 | 463 | 464 | 465 | 466 | 467 |
|---|---|---|---|---|---|---|
| EXPECTED VALUE N OF NUMBER OF TIMES OF GC (CONSIDERING INDEX VALUE α AND ELAPSED TIME UNTIL UPDATE OR DELETE OPERATION) | EXPECTED VALUE (E0 = D × N) OF TOTAL SIZE MOVED IN GC, WHEN NO REARRANGEMENT PROCESSING IS PERFORMED | EXPECTED VALUE (E) OF TOTAL SIZE MOVED IN GC, WHEN REARRANGEMENT PROCESSING IS PERFORMED | ACCESS REDUCTION AMOUNT IN GC (B = E0 - E), BY REARRANGEMENT PROCESSING | WRITE AMOUNT (A) OF REARRANGEMENT PROCESSING | WRITE AMOUNT COMPARISON (A - B) | REARRANGEMENT PROCESSING START/ CANCELLATION |
|  |  |  |  |  |  | START INSTRUCTION (IF A−B<0) CANCEL INSTRUCTION (IF A−B≧0) |

FIG. 4E

| 1051 ↗ | 461 | 462 | 463 | 464 | 465 | 466 | 1167 |
|---|---|---|---|---|---|---|---|
| | EXPECTED VALUE N OF NUMBER OF TIMES OF GC (CONSIDERING INDEX VALUE α AND ELAPSED TIME UNTIL UPDATE OR DELETE OPERATION) | EXPECTED VALUE (E0 = D × N) OF TOTAL SIZE MOVED IN GC, WHEN NO REARRANGEMENT PROCESSING IS PERFORMED | EXPECTED VALUE (E) OF TOTAL SIZE MOVED IN GC, WHEN REARRANGEMENT PROCESSING IS PERFORMED | ACCESS REDUCTION AMOUNT IN GC (B = E0 - E), BY REARRANGEMENT PROCESSING | WRITE AMOUNT (A) OF REARRANGEMENT PROCESSING | WRITE AMOUNT COMPARISON (A - B) | SECOND CONDITION FOR PRIORITY PROCESSING DETERMINATION |
| | | | | | | | 1 : (IF A−B<0) 0 : (IF A−B≧0) |

FIG. 11A

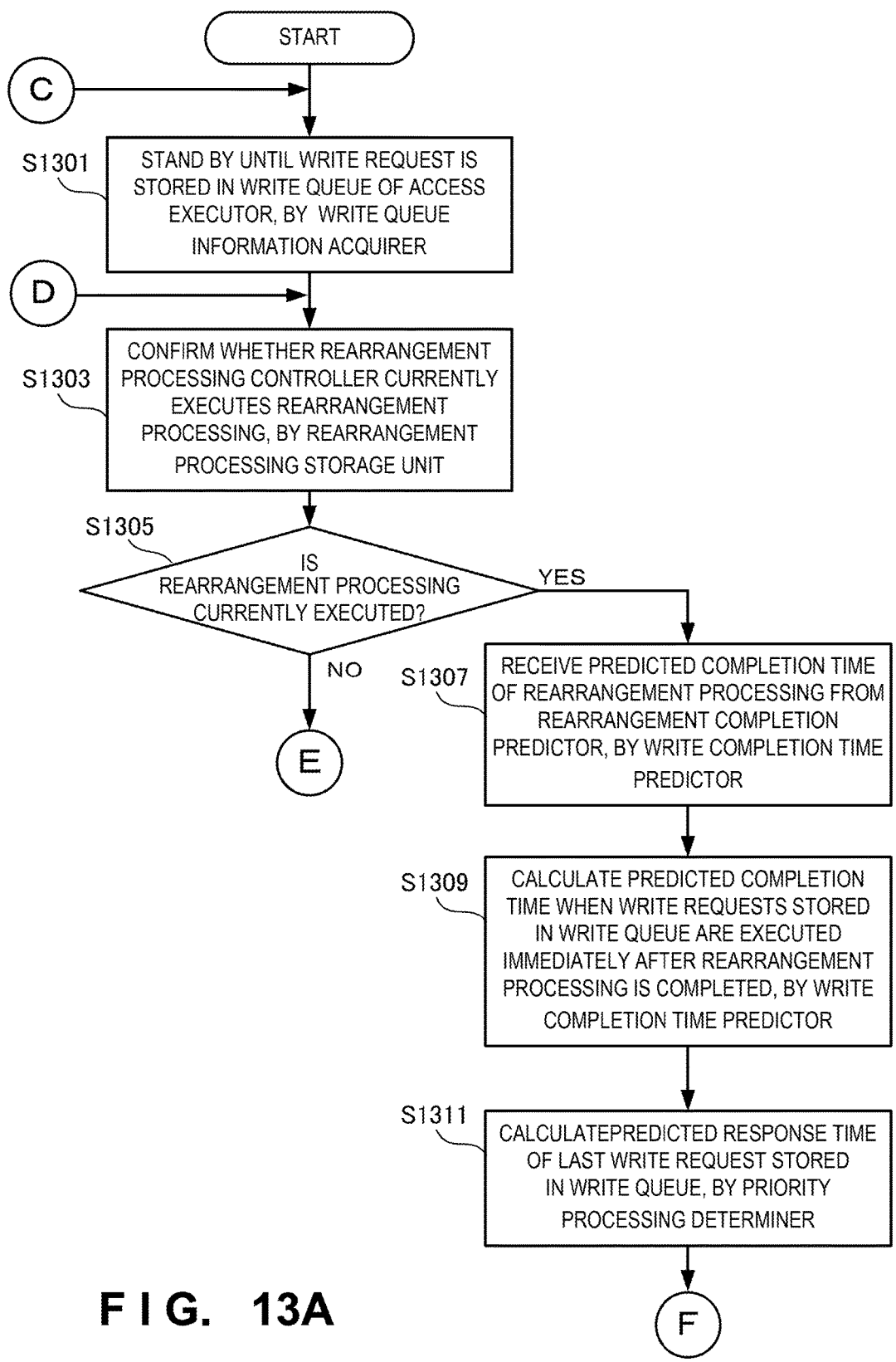
F I G. 13A

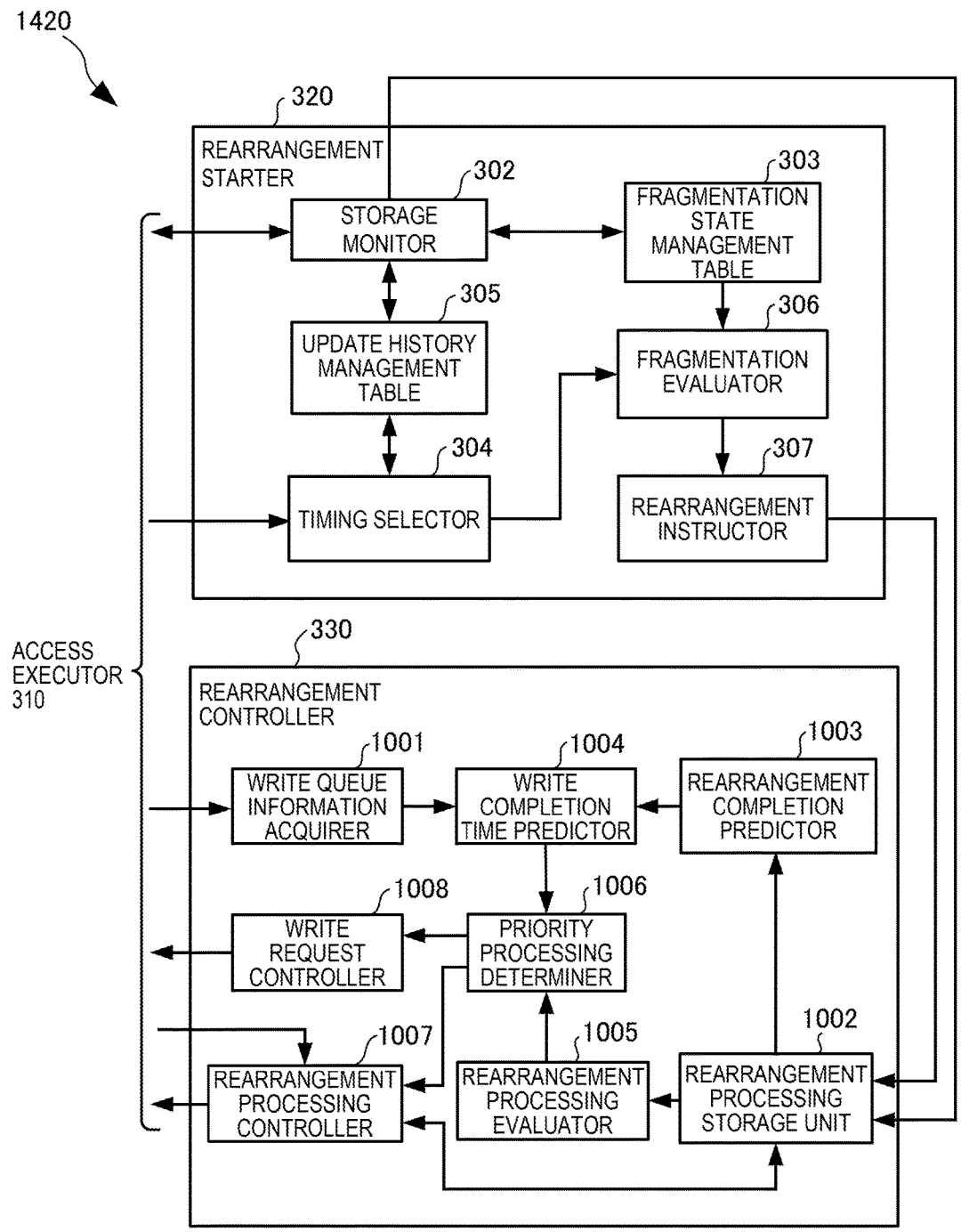
F I G. 14

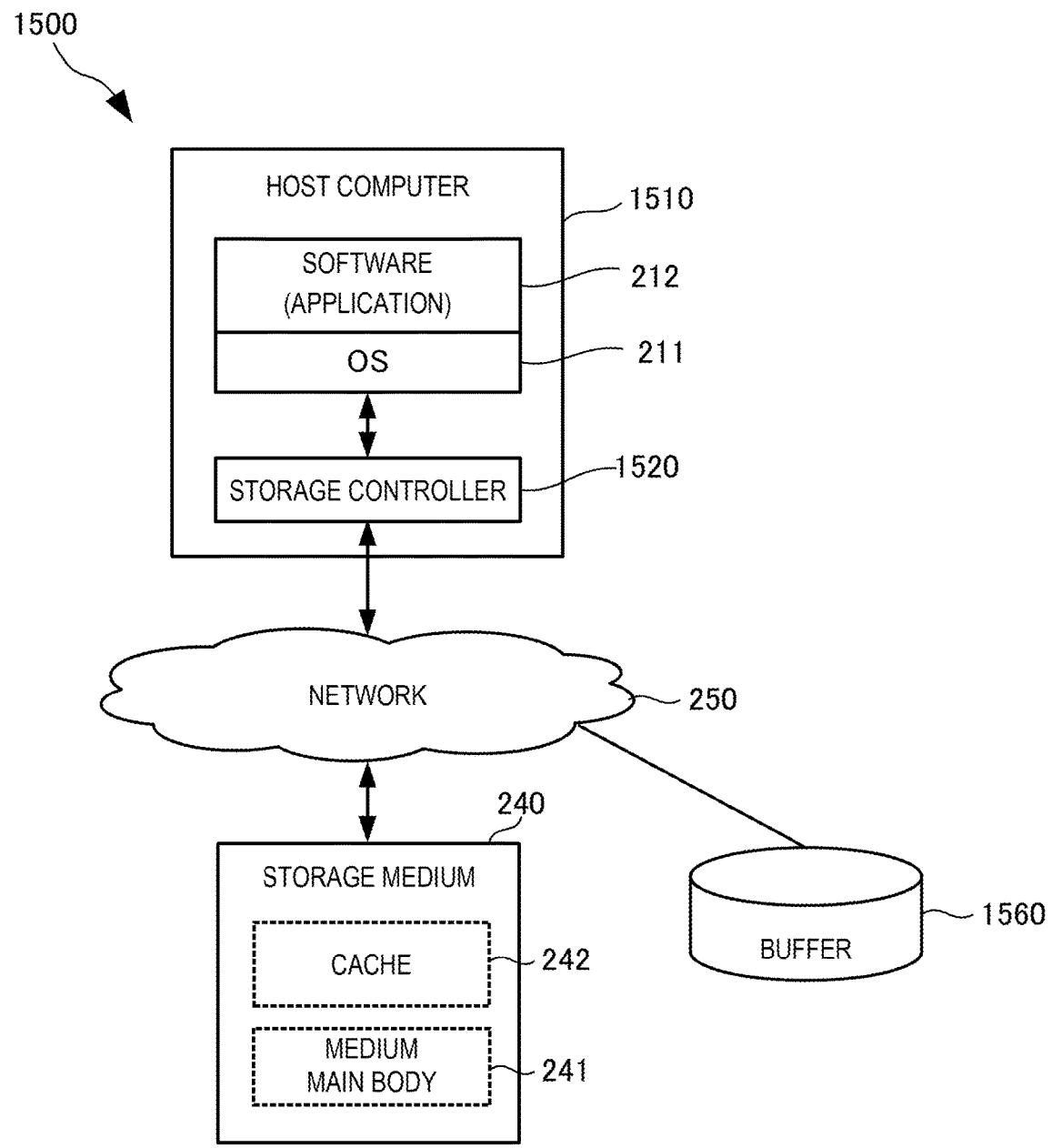
F I G. 15

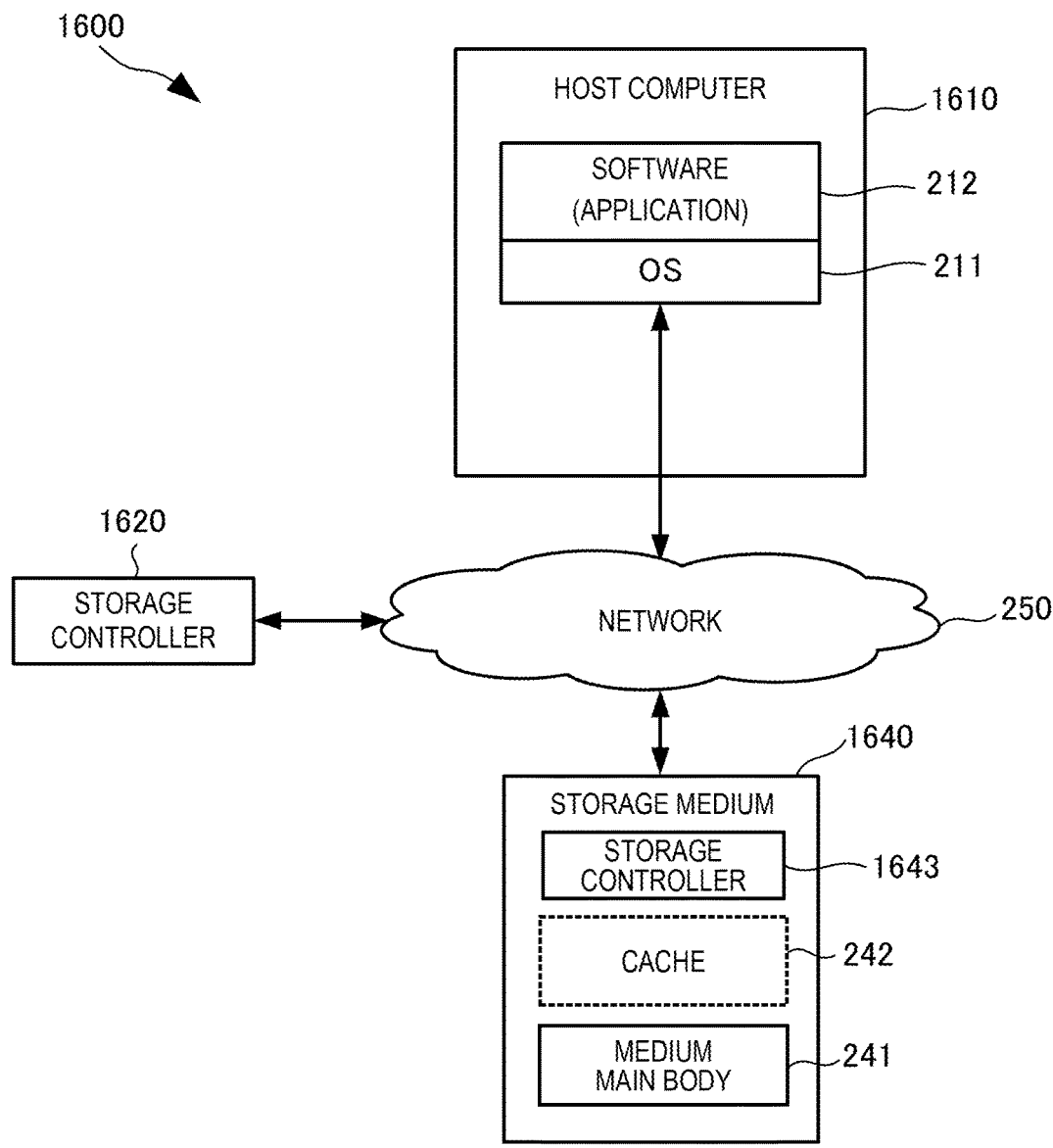
F I G. 16

INFORMATION PROCESSING SYSTEM, STORAGE CONTROL APPARATUS, STORAGE CONTROL METHOD, AND STORAGE CONTROL PROGRAM

CROSS REFERENCE TO RELATED APPLICATIONS

This application is a National Stage of International Application No. PCT/JP2016/066684 filed Jun. 3, 2016, claiming priority based on Japanese Patent Application No. 2015-135002 filed Jul. 6, 2015, the contents of all of which are incorporated herein by reference in their entirety.

CROSS REFERENCE TO RELATED APPLICATIONS

This application is based upon and claims the benefit of priority from Japanese Patent application No. 2015-135002, filed on Jul. 6, 2015, the disclosure of which is incorporated herein in its entirety by reference.

TECHNICAL FIELD

The present invention relates to an information processing system, a storage control apparatus, a storage control method, and a storage control program.

BACKGROUND ART

In the above technical field, patent literature 1 discloses a technique in which an FTL (Flash Translation Layer) in a controller in an SSD (Solid State Drive) sequentially stores data in pages on a page basis in a write-once manner to avoid page save processing that is performed when updating data in a NAND flash memory (to be referred to as a NAND flash hereinafter). Patent literature 2 discloses a technique of adding a free area by estimating fragmentation based on the number of data extents.

Non-patent literature 1 discloses a technique of preventing, from increasing, the load of GC (Garbage Collection) of collecting a memory area storing data that has become unnecessary due to update or the like in order for an SSD to continuously store write data from a host computer in a write-once manner. Non-patent literature 1 describes a method of reducing the load of GC by adding information called the same stream ID to each set of data having the same property with respect to a write command from the host computer, selecting a storage destination block of the NAND flash in the SSD based on the stream ID, and storing the write data so that the update timings of data in each block are close to each other.

CITATION LIST

Patent Literature

Patent literature 1: U.S. Pat. No. 5,937,425
Patent literature 2: Japanese PCT National Publication No. 2014-517971

Non-Patent Literature

Non-patent literature 1: Jeong-Uk Kang, Jeeseok Hyun, Hyunjoo Maeng, and Sangyeun Cho, "The Multi-streamed Solid-State Drive", 6th USENIX Workshop on Hot Topics in Storage and File Systems (HotStorage), 2014

SUMMARY OF THE INVENTION

Technical Problem

In the techniques described in the above literatures, however, it is only possible to cope with individual factors for fragmentation. That is, the techniques do not consider a method of improving the access performance of a storage medium and prolonging the life of the storage medium by optimizing, as a whole, a write request from the host computer and data storage in a block of the SSD including internal processing such as rearrangement processing and GC in an environment in which the execution statuses and combination of a plurality of applications dynamically change.

The present invention enables to provide a technique of solving the above-described problem.

Solution to Problem

One example aspect of the present invention provides a storage control apparatus comprising:
  a fragmentation evaluator that evaluates a degree to which data corresponding to a logical address area in a logical address space used by a host computer to access a storage medium is fragmented and stored in a plurality of physical address areas in a physical address space used in the storage medium;
  a timing selector that selects a timing of performing evaluation by the fragmentation evaluator; and
  a rearrangement instructor that instructs execution of data rearrangement processing of rearranging the data corresponding to the logical address area to be written in continuous physical address areas in the storage medium, based on the degree evaluated by the fragmentation evaluator at the timing.

Another example aspect of the present invention provides a storage control method comprising:
  evaluating a degree to which data corresponding to a logical address area in a logical address space used by a host computer to access a storage medium is fragmented and stored in a plurality of physical address areas in a physical address space used in the storage medium;
  selecting a timing of performing evaluation in the evaluating; and
  instructing execution of data rearrangement processing of rearranging the data corresponding to the logical address area to be written in continuous physical address areas in the storage medium, based on the degree evaluated in the evaluating at the timing.

Still other example aspect of the present invention provides a storage control program for causing a computer to execute a method, comprising:
  evaluating a degree to which data corresponding to a logical address area in a logical address space used by a host computer to access a storage medium is fragmented and stored in a plurality of physical address areas in a physical address space used in the storage medium;
  selecting a timing of performing evaluation in the evaluating; and
  instructing execution of data rearrangement processing of rearranging the data corresponding to the logical address area to be written in continuous physical address areas in the storage medium, based on the degree evaluated in the evaluating at the timing.

Still other example aspect of the present invention provides an information processing system comprising:

a host computer;

a storage medium; and a storage control apparatus that controls access to the storage medium by the host computer, the storage control apparatus including a fragmentation evaluator that evaluates a degree to which data corresponding to a logical address area in a logical address space used by the host computer to access the storage medium is fragmented and stored in a plurality of physical address areas in a physical address space used in the storage medium, a timing selector that selects a timing of performing evaluation by the fragmentation evaluator, and a rearrangement instructor that instructs execution of data rearrangement processing of rearranging the data corresponding to the logical address area to be written in continuous physical address areas in the storage medium, based on the degree evaluated by the fragmentation evaluator at the timing.

Advantageous Effects of Invention

According to the present invention, it is possible to improve the access performance of a storage medium and prolong the life of the storage medium while suppressing an increase in fragmentation and a delay in normal write processing by avoiding frequent occurrence of rearrangement processing.

BRIEF DESCRIPTION OF DRAWINGS

FIG. 2 is a view showing the arrangement of an information processing system according to the second example embodiment of the present invention;

FIG. 4B is a table showing the structure of an update history management table according to the second example embodiment of the present invention;

FIG. 4D is a table showing the structure of a fragmentation evaluation table according to the second example embodiment of the present invention;

FIG. 4E is a table showing the structure of a rearrangement evaluation table according to the second example embodiment of the present invention;

FIG. 11A is a table showing the structure of a rearrangement evaluation table according to the third example embodiment of the present invention;

FIG. 13A is a flowchart illustrating a processing procedure for a write request during rearrangement in the storage controller according to the third example embodiment of the present invention;

FIG. 14 is a block diagram showing the functional arrangement of a storage control apparatus according to the fourth example embodiment of the present invention;

FIG. 15 is a view showing the arrangement of an information processing system according to the fifth example embodiment of the present invention; and FIG. 16 is a view showing the arrangement of an information processing system according to the sixth example embodiment of the present invention.

DESCRIPTION OF EXAMPLE EMBODIMENTS

Example embodiments of the present invention will now be described in detail with reference to the drawings. It should be noted that the relative arrangement of the components, the numerical expressions and numerical values set forth in these example embodiments do not limit the scope of the present invention unless it is specifically stated otherwise.

First Example Embodiment

A storage control apparatus 100 according to the first example embodiment of the present invention will be described with reference to FIG. 1. The storage control apparatus 100 is an apparatus that controls access to a storage medium by a host computer.

Figure 1:
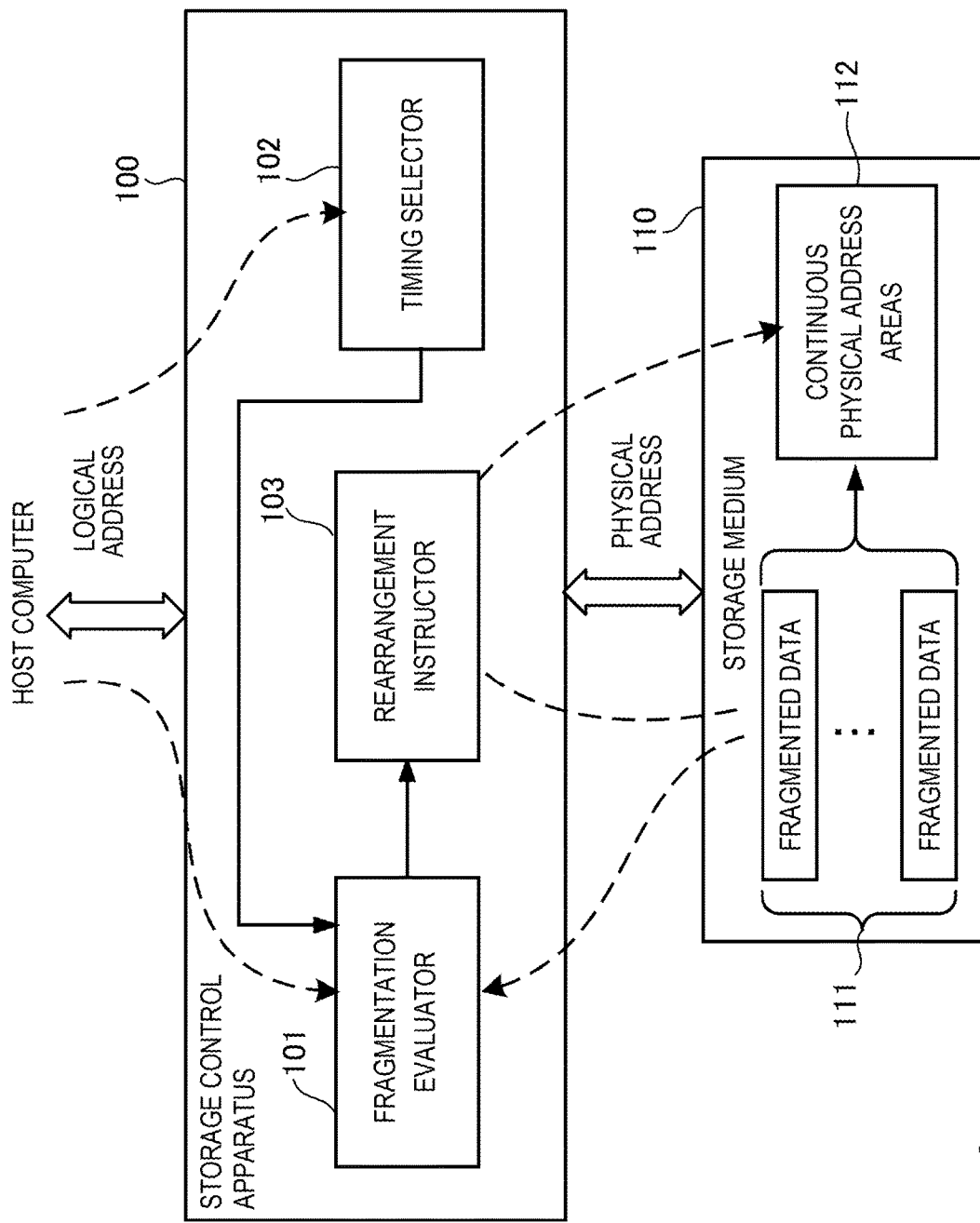
FIG. 1 is a block diagram showing the arrangement of a storage control apparatus according to the first example embodiment of the present invention.

As shown in FIG. 1, the storage control apparatus 100 includes a fragmentation evaluator 101, a timing selector 102, and a rearrangement instructor 103. The fragmentation evaluator 101 evaluates a degree to which data corresponding to a logical address area in a logical address space used by the host computer to access a storage medium 110 is fragmented and stored in a plurality of physical address areas in a physical address space used in the storage medium 110. The timing selector 102 selects a timing of performing evaluation by the fragmentation evaluator 101. The rearrangement instructor 103 instructs, based on the degree evaluated by the fragmentation evaluator 101 at the timing, execution of data rearrangement processing of rearranging data 111 corresponding to the logical address area to be written in continuous physical address areas 112 in the storage medium 110.

According to this example embodiment, by selecting a timing of rearranging data so as to cancel a fragmentation state, it is possible to improve the access performance of a storage medium and prolong the life of the storage medium while suppressing an increase in fragmentation and a delay in normal write processing by avoiding frequent occurrence of rearrangement processing.

Second Example Embodiment

An information processing system including a storage control apparatus as a storage controller in a host computer according to the second example embodiment of the present invention will be described next. In the information processing system according to this example embodiment, the storage controller estimates the fragmentation state of memory areas in a physical address space in a storage medium by determining the end of a write access operation of writing a series of data as the timing of rearrangement processing, based on history information of access (read and write) to the storage medium by the OS (Operating System) or an application program (to be referred to as an application hereinafter) of the host computer. If the fragmentation state exceeds a predetermined state, defragmentation is implemented by collectively rearranging the areas in the fragmentation state.

<<Explanation of Technical Premise>>

Prior to a description of a storage control method according to this example embodiment, a storage control technique according to a technical premise will be explained.

In recent years, with respect to a NAND flash used as a memory element in a storage medium such as an SSD, it is necessary to erase stored old data at the time of update of data. However, erase processing for the NAND flash is performed for each block including a plurality of pages as a smallest unit of read and write processes. Therefore, when erasing or updating data stored in pages of the NAND flash, it is necessary to save the remaining pages included in the same block.

In many SSDs, to avoid page save processing that is performed when updating data in the NAND flash memory, an FTL in a controller stores data on a page basis in a write-once manner. More specifically, the FTL sequentially stores data, which have been externally requested to be written, in the pages of a block of the NAND flash in which no data is stored, regardless of write destination addresses. When updating data corresponding to each address, updated data is stored in a page, in which no data is stored, without updating a page in which the original data is stored. By using the write-once manner, page save processing that occurs every time data is updated is avoided. If data is stored in all the pages in the block, the FTL selects a block to store data next from blocks in which no data is written. The FTL sequentially stores the externally written data in the respective pages of the selected block in the same manner, as described in, for example, patent literature 1.

On the other hand, in order for the SSD to continuously store write data from the host computer in a write-once manner, it is necessary to perform GC (Garbage Collection) to collect a memory area storing data that has become unnecessary due to update or the like. In the SSD, in addition to movement of data in general GC, it is necessary to perform erase processing on a block basis to reuse a memory area storing unnecessary data. In GC for the SSD, to collect the memory area on a block basis, save processing is performed for a page with valid data included in a block to be collected. The save processing is implemented by read for the page of the NAND flash and write for the save destination page. That is, the load of GC increases in proportion to the number of pages to be saved. An increase in load of GC delays access processing in the SSD and degrades the performance. In the save processing, data is written in the NAND flash. The bit error occurrence rate increases along with an increase in erase count of the NAND flash element, thereby making it difficult to store normal data. The save processing of the valid page that increases the amount of write data in the NAND flash element, that is, the erase count consumes the life of the SSD.

As one of factors for increasing the number of pages saved in GC in the SSD, a plurality of data are simultaneously stored. For example, if a plurality of files holding different data are simultaneously stored in the SSD, the data of the respectively files are stored in a block of the NAND flash in the arrival order, and thus the data are fragmented. If the data of the respective files are written in the SSD by a size smaller than the size of a block, the data of the plurality of files are mixed and stored in the block of the NAND flash. If the simultaneously stored files are updated or deleted at different timings, pages storing valid data and invalid data are mixed in the block. Thus, the data of the files which have not been updated or deleted in GC are saved.

Furthermore, data which has been fragmented once is stored in a movement destination block in GC together with another saved data. If data continuously stored in the SSD without being updated or deleted is fragmented, the data may be invalidated in a save destination block when another data is updated or deleted. When these blocks are to be collected again in GC, save processing for the same data is repeatedly performed. Thus, as data is saved for a longer period, fragmentation at the time of data storage in the SSD more largely influences degradation in performance and consumption of the life.

As a method of avoiding fragmentation of data that occurs when a plurality of data are simultaneously written, non-patent literature 1 describes a method of reducing the load of GC by adding information called the same stream ID to each set of data having the same property with respect to a write command from the host computer, selecting a storage destination block of the NAND flash based on the stream ID in the SSD, and storing write data so that the update timings of data in each block are close to each other. In this method, however, since it is necessary to alter a protocol for accessing the SSD from the host computer, and cope with both the host computer and the SSD, much cost is required to apply the technique. In addition, it is difficult to apply the technique to an environment built using existing hardware and software.

<<Explanation of Example Embodiment>>

To solve the above-described problems of the technical premise, the second to fifth example embodiments provide a technique for improving the access performance of an SSD and prolonging the life of the SSD by reducing the load of processing for saving valid data from a block to be collected in GC as one of internal processes executed for a memory area of a NAND flash in the SSD.

More specifically, an LBA (Logical Block Address) space provided by the SSD or a storage status in the NAND flash for each of successive write access requests is monitored, and a state in which data are fragmented into many blocks in the NAND flash is canceled. In general, data such as a file having a series of meanings are stored in memory areas represented by continuous LBAs. All data included in a single file are to be updated or deleted in many cases. That is, it is considered that, among write data in the SSD, data such as a file represented by continuous or adjacent LBAs often have the same period (to be referred to as a lifetime hereinafter in this specification) from a storage operation to an update or delete operation.

The storage status of write data in the NAND flash in the SSD is monitored for each series of successive write access operations for a predetermined area or file in the LBA space. If write data are stored in each block of the NAND flash of the SSD in a write-once manner, the write data for continuous LBAs are stored in pages of the same block of the NAND flash. On the other hand, an area in which a write operation of data of a small size is intermittently performed is stored in a state in which each write data is fragmented into a plurality of blocks since write data of small amounts intermittently arrive. Since the block storing the fragmented write data is stored in a state in which another area or successively accessed data is mixed, the mixture of data having different lifetimes increases the load of GC.

To cope with this, in this example embodiment, the degree of fragmentation is recorded for each predetermined area in the LBA space. Alternatively, data storage in which write access operations are parallelly executed for each series of continuous areas such as a file is managed. Defragmentation is performed by rearranging all data in an area whose degree of fragmentation has increased to a predetermined degree or more or in continuous areas in which a large amount of data is stored at the same time. The occurrence of fragmentation in each area on the LBA space and an area storing continuous data such as a file is estimated from the write data amount of the whole SSD between write requests for the same area and recorded. When storing data in the NAND flash in a write-once manner, if a block is filled with the write data, the remaining write data are stored in a different block. That is, when issuing a write request to each area on the LBA space, the total capacity of write data stored in another area on the SSD after issuing the last write request to the same area is confirmed. If the total capacity is equal to or larger than a predetermined capacity, it is determined that the write data are stored in a new block, and the degree of fragmentation of the area to which the write request has been issued is increased. Furthermore, if a plurality of files are simultaneously written, data of the plurality of files are mixed and stored in a block, and thus fragmentation in the NAND flash in the SSD progresses as the number of files that are simultaneously written increases.

As for many existing SSDs, as a method of canceling data fragmentation that occurs when a plurality of data are simultaneously written, there is provided a method of rearranging the data one by one. By externally rearranging data, the data is stored in a block of the NAND flash without being fragmented. The data before rearrangement is invalidated, similarly to the normal update or delete operation for data stored in the SSD. That is, it is possible to reduce the write amount in the NAND flash and suppress degradation in performance and consumption of the life by preventing data movement along with block collection in GC.

To maximize the effect of the improvement of the performance of the SSD and the prolongation of the life of the SSD obtained by data rearrangement, however, it is necessary to rearrange only appropriate data at an appropriate timing in consideration of the effect obtained by rearrangement.

For example, the effect of the improvement of the performance and the prolongation of the life obtained by rearrangement is different depending on the data stored in the SSD. The data moving amount in GC, that is reduced by data rearrangement, depends on a fragmentation status when data to be rearranged are stored in the SSD, and a period from when each data is stored in the SSD until the data is invalidated by an update or delete operation. That is, the fragmentation status when each data is stored in the SSD changes depending on the size and frequency of simultaneously stored data. In a block of the NAND flash in which each data is stored, as the ratio of the amount of simultaneously stored data to the total amount increases, the frequency at which the simultaneously stored data are invalidated by an update or delete operation increases. The probability that data is moved in GC to collect a page storing the data increases.

The period from when each data is stored in the SSD until the data is invalidated by an update or delete operation is proportional to the number of times each data is to be moved along with collection of a free area of the block in GC. That is, rearrangement for the SSD is desirably performed by excluding data having a high update frequency. The data having a high update frequency is generally updated or deleted within a short period. Thus, even if such data is fragmented and stored in the SSD, the possibility that the data is to be moved along with collection of the block in GC is low. Consequently, rearrangement of the data having a high update frequency increases the write data amount in the SSD.

In addition, rearrangement of data in the SSD needs to be executed after storage of a series of data ends. If rearrangement is executed before completion of data storage, fragmentation occurs between the rearranged data and a series of data following data newly stored after the execution of rearrangement. To prevent occurrence of fragmentation before and after rearrangement, it is necessary to detect completion of storage of a series of data. Since, however, the procedure of storing a series of data depends on an access method, a storing end detection method different for each access method is required.

Since this example embodiment considers an appropriate timing of starting rearrangement processing for reducing fragmentation into a plurality of physical address areas, rearrangement processing does not occur frequently, thereby suppressing an increase in fragmentation and a delay in normal write processing. That is, for a set of data fragmented and stored in the internal NAND flash when simultaneously stored in the SSD, rearrangement processing is performed by selecting an appropriate set of data and an appropriate timing. This makes it possible to effectively reduce the amount of the set of data to be moved by GC processing in the SSD, and improve the effect of the improvement of the performance of the SSD and the prolongation of the life of the SSD obtained by rearrangement.

<<Information Processing System>>

FIG. 2 is a view showing the arrangement of an information processing system 200 according to this example embodiment.

Referring to FIG. 2, the information processing system 200 according to this example embodiment includes one or more host computers 210, a storage medium 240, and a network 250 that connects the host computers 210 and the storage medium 240.

Each host computer 210 includes an OS (Operating System) 211, an application 212 as software operating on the OS 211, and a storage controller 220 of this example embodiment. The storage controller 220 controls access processing including read and write for the storage medium 240 in the processing of the OS 211 and the application 212.

The storage medium 240 is a storage medium such as an SSD using a NAND flash as a memory element. Note that the storage medium 240 may include a medium main body 241 and a cache 242. The form of the network 250 is not particularly limited, and the host computer 210 and the storage medium 240 may be directly connected. Furthermore, the host computer 210 may be formed by a system or a plurality of apparatuses connected by the network 250.

<<Functional Arrangement of Storage Control Apparatus>>

Figure 3A:
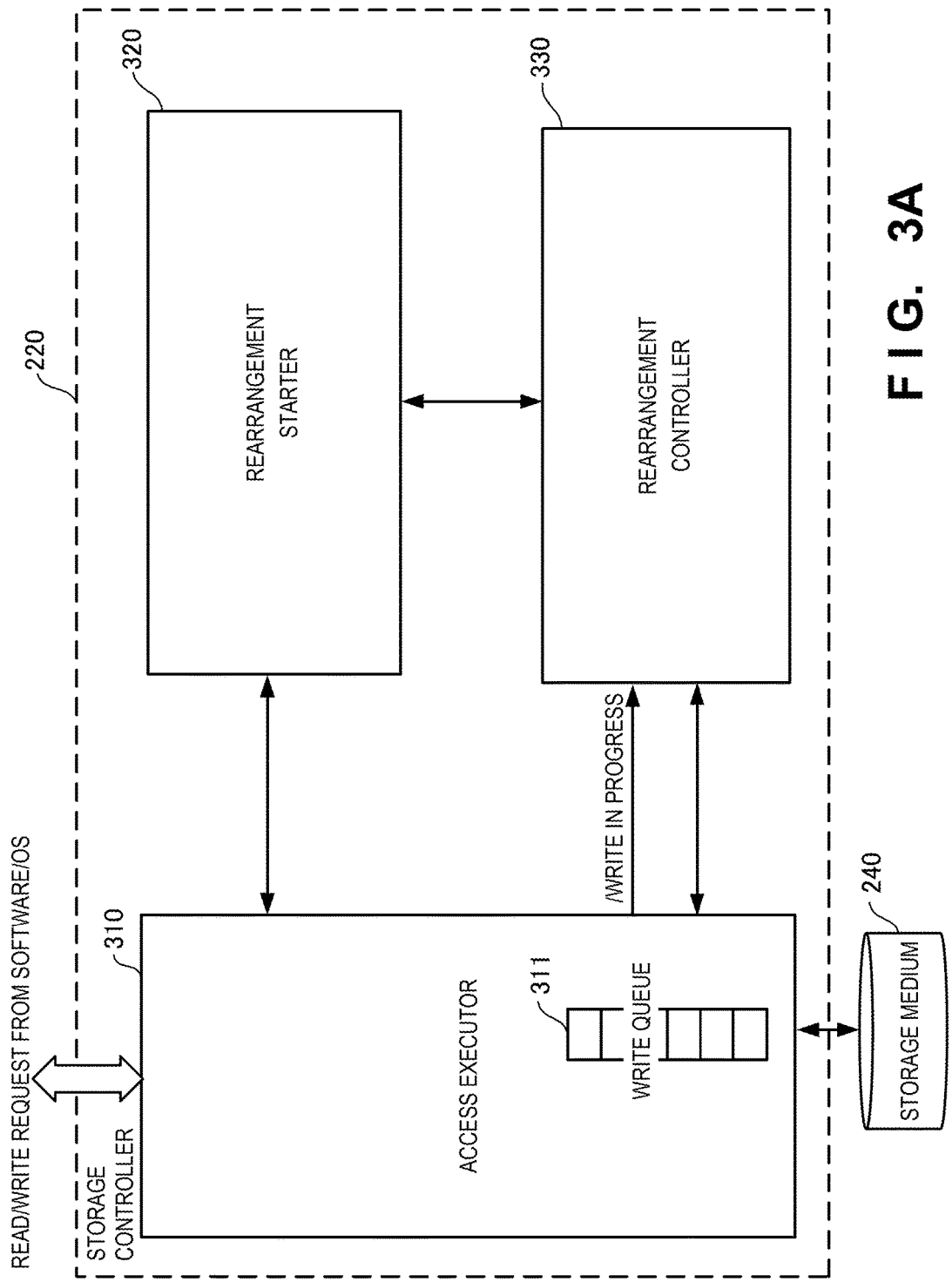
FIG. 3A is a block diagram showing the functional arrangement of a storage control apparatus according to the second example embodiment of the present invention.

FIG. 3A is a block diagram showing the functional arrangement of the storage controller 220 serving as a storage control apparatus according to this example embodiment.

Referring to FIG. 3A, the storage controller 220 includes an access executor 310, a rearrangement starter 320, and a rearrangement controller 330.

The access executor 310 receives an access request from the OS 211 or application 212 operating on host computer 210, and performs necessary access processing for the storage medium 240. The access executor 310 includes a write queue 311 that holds a write request for the storage medium 240, and temporarily stores a write request for the write queue 311 and then issues a write request to the storage medium 240. Note that the write queue 311 holds write requests in accordance with first-in first-out or a priority order.

At the end of storage of a series of data, the rearrangement starter 320 evaluates the degree of data fragmentation that occurs when a plurality of data are simultaneously written. If rearrangement processing of performing defragmentation improves the access performance to the storage medium, the rearrangement starter 320 instructs the rearrangement controller 330 to start the rearrangement processing. Under the rearrangement control of the rearrangement controller 330, the access executor 310 performs the rearrangement processing of reading data from an area on the storage medium 240 and writing the data in continuous areas.

Note that the arrangement of the rearrangement controller 330 according to this example embodiment is not limited as long as the rearrangement processing by the access executor 310 for the area on the storage medium 240 is controlled. Furthermore, data can be read from the area on the storage medium 240 by issuing a request to a cache memory (not shown) for the storage medium 240, instead of directly issuing a request to the storage medium 240.

(Rearrangement Starter)

Figure 3B:
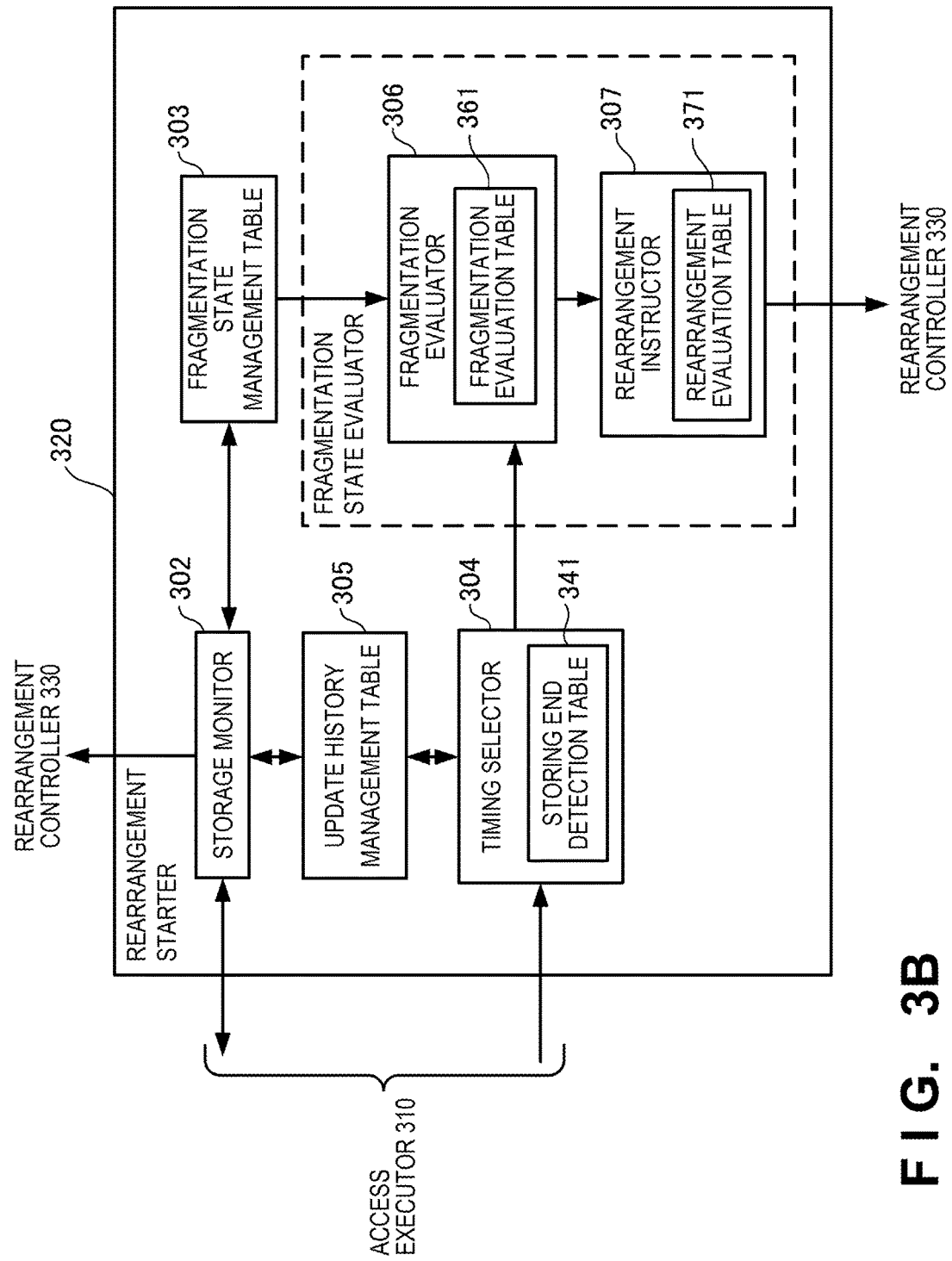
FIG. 3B is a block diagram showing the functional arrangement of a rearrangement starter according to the second example embodiment of the present invention.

FIG. 3B is a block diagram showing the functional arrangement of the rearrangement starter 320 according to this example embodiment.

The rearrangement starter 320 includes a storage monitor 302, a fragmentation state management table 303, a timing selector 304, an update history management table 305, a fragmentation evaluator 306, and a rearrangement instructor 307.

The storage monitor 302 monitors a write request for the storage medium 240 from the OS 211 or application 212 operating on the host computer 210, and specifies an entry corresponding to data to be updated by the write request in the fragmentation state management table 303. If there is no corresponding entry in the fragmentation state management table 303, the storage monitor 302 newly registers an entry. For the specified or registered entry, the storage monitor 302 newly calculates a data size after completion of the write request and the size of data mixed and stored with the data, and performs an update operation. The storage monitor 302 updates information of the total write amount of the storage medium 240 at the time of the last write operation, that is necessary to calculate a mixed data size stored in the entry. In addition, the storage monitor 302 updates the entry corresponding to the data updated by the write request or newly creates an entry in the update history management table 305, similarly to the fragmentation state management table 303. The storage monitor 302 updates last update time stored in the entry in the update history management table 305.

For each data during storage processing among the data stored in the storage medium 240, the fragmentation state management table 303 records, as information about the fragmentation state, a data size, the size of data mixed and stored with the data, and the total write amount of the storage medium 240 at the time of the last data write operation. The fragmentation state management table 303 also records the current total write amount of the storage medium 240.

The timing selector 304 includes a storing end detection table 341, and selects a timing of executing rearrangement processing. That is, the timing selector 304 detects the end of the storage processing of each data in the storage medium 240 from the OS 211 or application 212 operating on the host computer 210. For example, with reference to the storing end detection table 341, the timing selector 304 detects a file closing request if the OS 211 or application 212 operating on the host computer 210 stores data on a file basis, and detects a message indicating the end of storage of an object if data are stored in an object basis. Alternatively, the timing selector 304 detects a message, an operation, or processing performed at the end of storage processing, such as termination or disconnection of session connection. Then, an entry, in the update history management table 305, corresponding to data for which storage has ended is changed to a storing end state. With reference to the last update time of each data stored in each entry in the update history management table 305, the timing selector 304 determines that storage processing has ended for data for which a predetermined time has elapsed since the last update time, and changes the entry to the storing end state.

For each data during storage processing among the data stored in the storage medium 240, the update history management table 305 records the last update time and information representing whether the storage processing has ended.

With reference to the information in the fragmentation state management table 303, the fragmentation evaluator 306 determines whether to execute rearrangement for the data for which the storage processing has ended. The fragmentation evaluator 306 calculates an index value representing the degree of fragmentation using a fragmentation evaluation table 361 with reference to the data size and mixed data size of the entry corresponding to the data, for which the storage processing has ended, in the fragmentation state management table 303.

The rearrangement instructor 307 uses the index value calculated by the fragmentation evaluator 306 to determine, if the degree of fragmentation exceeds a predetermined reference value, that it is necessary to perform defragmentation by rearrangement, and executes the rearrangement processing of the data via the rearrangement controller 330. Note that by using the rearrangement evaluation table, the rearrangement instructor 307 sets, as the effect of rearrangement, the expected reduction amount of the data moving amount in GC, and compares the effect of rearrangement with the amount of write data in the storage medium 240 generated by rearrangement, that is, the data size. If the effect of rearrangement is larger, the rearrangement instructor 307 may execute rearrangement. In this case, to more correctly evaluate the effect of rearrangement, the rearrangement instructor 307 calculates the expected reduction value of the data moving amount in GC, that is reduced when the data are rearranged, using the data size and mixed data size which have been used to calculate the index value representing the degree of fragmentation.

Note that the fragmentation evaluator 306 and the rearrangement instructor 307 may integrally function as a fragmentation state evaluator.

(Fragmentation State Management Table)

Figure 4A:
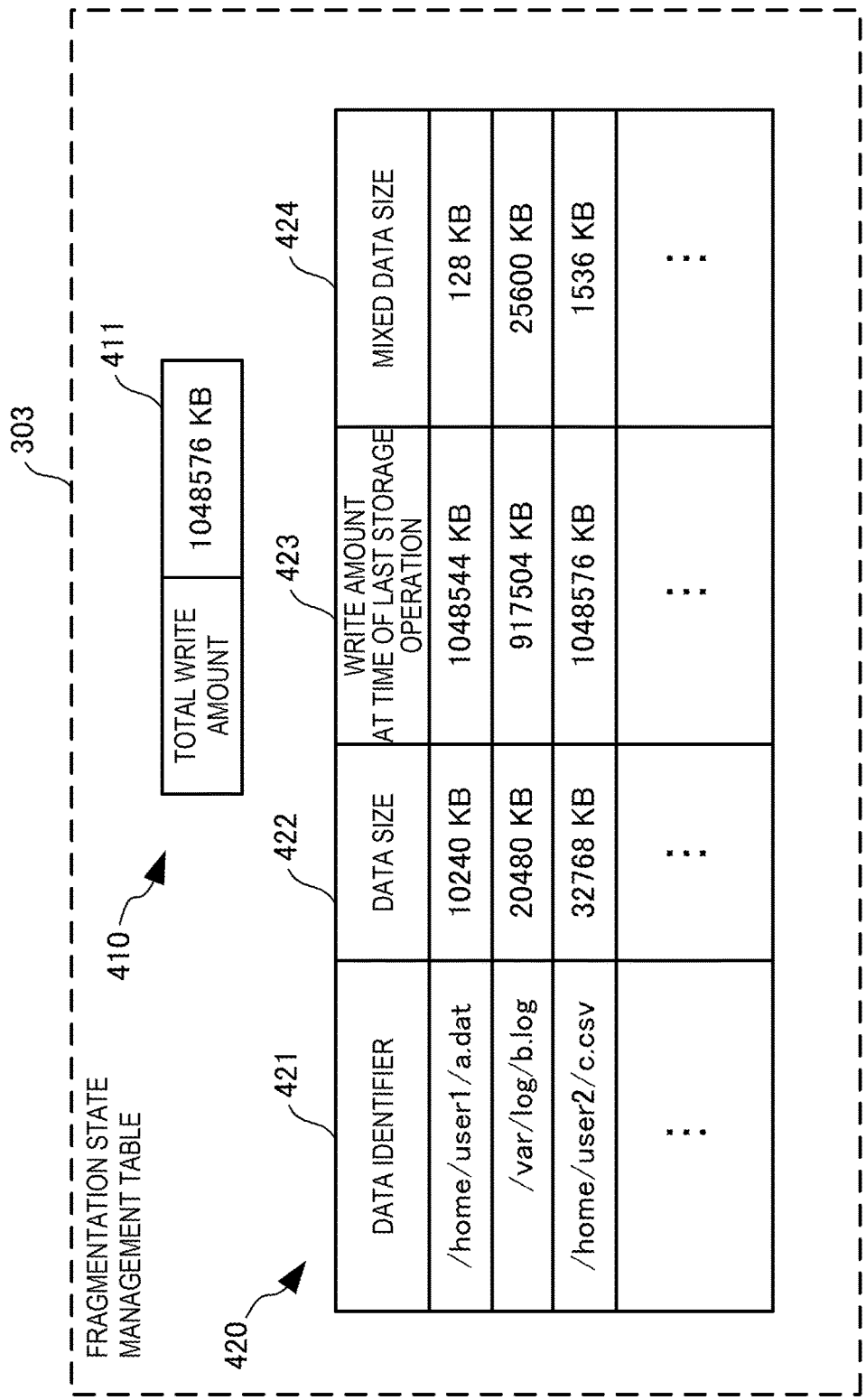
FIG. 4A is a view showing the structure of a fragmentation state management table according to the second example embodiment of the present invention.

FIG. 4A is a view showing the structure of the fragmentation state management table 303 according to this example embodiment. The fragmentation state management table 303 includes a total write amount management table 410 that manages the current total write amount of the storage medium 240, and a storage entry table 420 that holds an entry for each data during storage processing.

The total write amount management table 410 manages a current total write amount 411 of the storage medium 240. If there are a plurality of storage media 240, the total write amount 411 is individually managed for each storage medium 240.

The storage entry table 420 stores a data size 422, a write amount 423 at the time of the last storage operation, and a mixed data size 424 in association with a data identifier 421 uniquely representing data corresponding to each entry. The write amount 423 at the time of the last storage operation indicates the total write amount of the storage medium 240 at the time of the last write operation of each data. The mixed data size 424 indicates the amount of data mixed and stored during a period from the start of storage of each data to the last write operation.

Note that the format of the data stored in the fragmentation state management table 303 is not limited to that shown in FIG. 4A. For example, a file name is used as the data identifier 421 in FIG. 4A by assuming a form in which data are stored in the storage medium 240 on a file basis. However, another identifier such as a number capable of uniquely identifying data may be used. If a form in which data is stored not in a file but in continuous blocks is assumed, for example, the first LBA is used as the data identifier 421. Furthermore, the data size 422, the write amount 423 at the time of the last storage operation, the mixed data size 424, and the total write amount 411 are represented in KB (kilobytes) in FIG. 4A. However, a different capacity unit may be used.

(Update History Management Table)

FIG. 4B is a table showing the structure of the update history management table 305 according to this example embodiment.

The update history management table 305 includes an entry for each data during storage processing. Each entry stores a data identifier 431 uniquely representing data corresponding to the entry, a storing end flag 432 indicating that data storage processing has ended, and last update time 433 indicating the time of the last write operation of the data.

Note that the format of the data stored in the update history management table 305 is not limited to that shown in FIG. 4B. For example, a file name is used as the data identifier 431 in FIG. 4B by assuming a form in which data are stored in the storage medium 240 on a file basis. However, similarly to the data identifier 421 in the fragmentation state management table 303, another identifier capable of uniquely identifying data may be used. In FIG. 4B, the storing end flag 432 has a format in which 1 is set when storage of data corresponding to each entry ends. However, another format may be adopted. If an entry in the update history management table 305 is always deleted when storage of each data ends, the storing end flag 432 may be eliminated.

Note that the update history management table 305 shown in FIG. 4B is separated from the fragmentation state management table 303 shown in FIG. 4A. However, these tables may be formed by a single table.

(Storing End Detection Table)

Figure 4C:
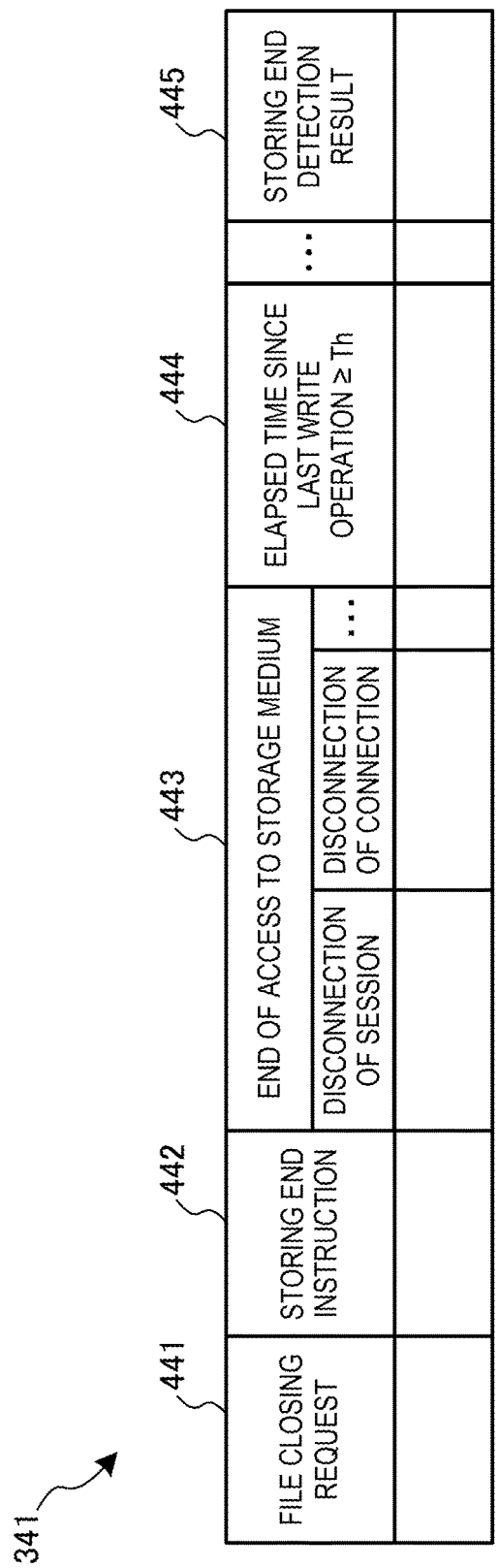
FIG. 4C is a table showing the structure of a storing end storing end detection table according to the second example embodiment of the present invention.

FIG. 4C is a table showing the structure of the storing end detection table 341 according to this example embodiment. The storing end detection table 341 is used by the timing selector 304 to select a timing of evaluating the degree of fragmentation and instructing rearrangement.

The storing end detection table 341 stores, as conditions for detecting the end of storage of a series of data of each entry, a file closing request 441, a storing end instruction 442, an end 443 of access to the storage medium 240, and a case 444 in which an elapsed time since the last write operation exceeds a threshold Th. Note that the end 443 of access includes disconnection of a session and disconnection of a connection.

(Fragmentation Evaluation Table)

FIG. 4D is a table showing the structure of the fragmentation evaluation table 361 according to this example embodiment. The fragmentation evaluation table 361 is used by the fragmentation evaluator 306 to evaluate the degree of fragmentation at the timing selected by the timing selector 304.

The fragmentation evaluation table 361 stores, in association with a data identifier 451 of each entry, a storing end flag 452, a data size (D) 453, a mixed data size (M) 454, and an index value $\{\alpha=M/(D+M)\}$ 455 representing the degree of fragmentation.

(Rearrangement Evaluation Table)

FIG. 4E is a table showing the structure of a rearrangement evaluation table 371 according to this example embodiment. The rearrangement evaluation table 371 is used by the rearrangement instructor 307 to determine whether to instruct rearrangement at the timing selected by the timing selector 304.

The rearrangement evaluation table 371 stores an expected value N 461 of the number of times of GC obtained in consideration of the index value $\alpha$ and the elapsed time until the update or delete operation, and an expected value (E0=D×N) 462 of the total size moved in GC when no rearrangement processing is performed. The rearrangement evaluation table 371 also stores an expected value (E) 463 of the total size moved in GC when rearrangement processing is performed, and an access reduction amount (B=E0−E) 464 in GC by the rearrangement processing. In addition, the rearrangement evaluation table 371 stores a write amount (A) 465 of the rearrangement processing and write amount comparison (A−B) 466. The rearrangement evaluation table 371 stores a rearrangement start instruction (if A−B<0) or a rearrangement cancel instruction (if A−B≥0) as a rearrangement processing start or cancellation determination result 467.

<<Hardware Arrangement of Host Computer>>

Figure 5:
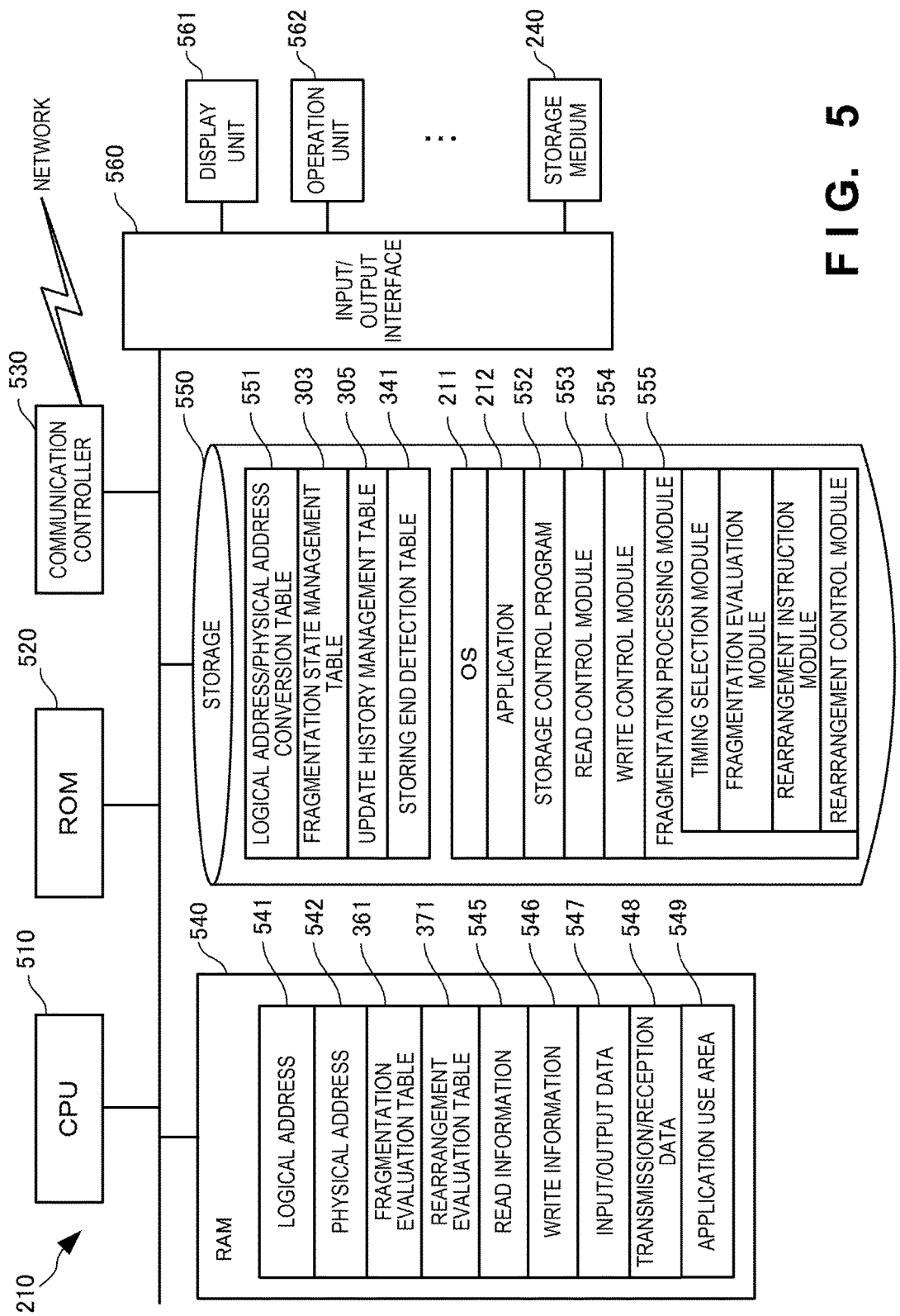
FIG. 5 is a block diagram showing the hardware arrangement of a host computer including a storage controller according to the second example embodiment of the present invention.

FIG. 5 is a block diagram showing the hardware arrangement of the host computer 210 including the storage controller 220 according to this example embodiment. Note that in FIG. 5, the storage controller 220 is shown as software processing of the host computer 210. However, the storage controller 220 may be implemented by a one-chip computer independent of the host computer 210.

Referring to FIG. 5, a CPU (Central Processing Unit) 510 is an arithmetic control processor, and implements the functional components of the storage controller 220 shown in FIGS. 3A and 3B by executing a program. A ROM (Read Only Memory) 520 stores permanent data such as initial data and a program, and programs. A communication controller 530 communicates with the storage medium 240 via the network 250. Note that the number of CPUs 510 is not limited to one, and a plurality of CPUs or a GPU (Graphical Processing Unit) for image processing may be included. The communication controller 530 desirably includes a CPU independent of the CPU 510, and writes or reads transmission/reception data in or from the area of a RAM (Random Access Memory) 540. It is desirable to provide a DMAC (Direct Memory Access Controller) (not shown) for transferring data between the RAM 540 and a storage 550. Furthermore, an input/output interface 560 desirably includes a CPU independent of the CPU 510, and writes or reads input/output data in or from the area of the RAM 540. Therefore, the CPU 510 processes the data by recognizing that the data has been received by or transferred to the RAM 540. Furthermore, the CPU 510 prepares processing results in the RAM 540, and delegates succeeding transmission or transfer to the communication controller 530, DMAC, or input/output interface 560.

The RAM 540 is a random access memory used as a temporary storage work area by the CPU 510. An area to store data necessary for implementation of the example embodiment is allocated to the RAM 540. A logical address 541 is an address used to access the storage medium 240 from the OS 211 or application 212. A physical address 542 is an address converted from the logical address 541 and used to access the storage medium 240. The fragmentation evaluation table 361 is the table shown in FIG. 4D and used to evaluate the degree of fragmentation. The rearrangement evaluation table 371 is the table shown in FIG. 4E and used to determine whether to instruct rearrangement. Read information 545 is information read from the storage medium 240 based on a request from the OS 211 or application 212. Write information 546 is information written in the storage medium 240 based on a request from the OS 211 or application 212. Input/output data 547 is data input/output via the input/output interface 560. Transmission/reception data 548 is data transmitted/received via the communication controller 530. An application use area 549 is an area used by the application for processing other than storage control.

The storage 550 stores a database, various parameters, or the following data or programs necessary for implementation of the example embodiment. A logical address/physical address conversion table 551 is a table used to convert the logical address 541 requested to be accessed from the OS 211 or application 212 into the physical address 542 used to access the storage medium 240, and changes in accordance with the correspondence between the address spaces. The fragmentation state management table 303 is a table having the structure shown in FIG. 4A. The update history management table 305 is a table having the structure shown in FIG. 4B. The storing end detection table 341 is the table shown in FIG. 4C and used to select a timing of starting rearrangement.

The storage 550 stores the following programs. The OS 211 is a basic program for controlling the whole host computer 210. The application 212 is a program currently executed by the host computer 210. A storage control program 552 is a program that implements access control according to this example embodiment when the storage medium 240 is accessed from the OS 211 or application 212. A read control module 553 is a module that controls read from the storage medium 240 in the storage control program 552. A write control module 554 is a module that controls write in the storage medium in the storage control program 552. A fragmentation processing module 555 is a module that rearranges the memory areas at the physical addresses to cancel the fragmentation state at the selected timing by monitoring the fragmentation state. The fragmentation processing module 555 includes a timing selection module, a fragmentation evaluation module, a rearrangement instruction module, and a rearrangement control module.

The input/output interface 560 interfaces input/output data with an input/output device. The input/output interface 560 is connected to a display unit 561 and an operation unit 562. The input/output interface 560 may also be connected to the storage medium 240. Furthermore, a loudspeaker serving as a voice output unit, a microphone serving as a voice input unit, or a GPS position determiner may be connected.

Note that programs and data that are associated with the general-purpose functions of the host computer 210 and other feasible functions are not shown in the RAM 540 or the storage 550 of FIG. 5.

<<Processing Procedure of Storage Controller>>

Figure 6:
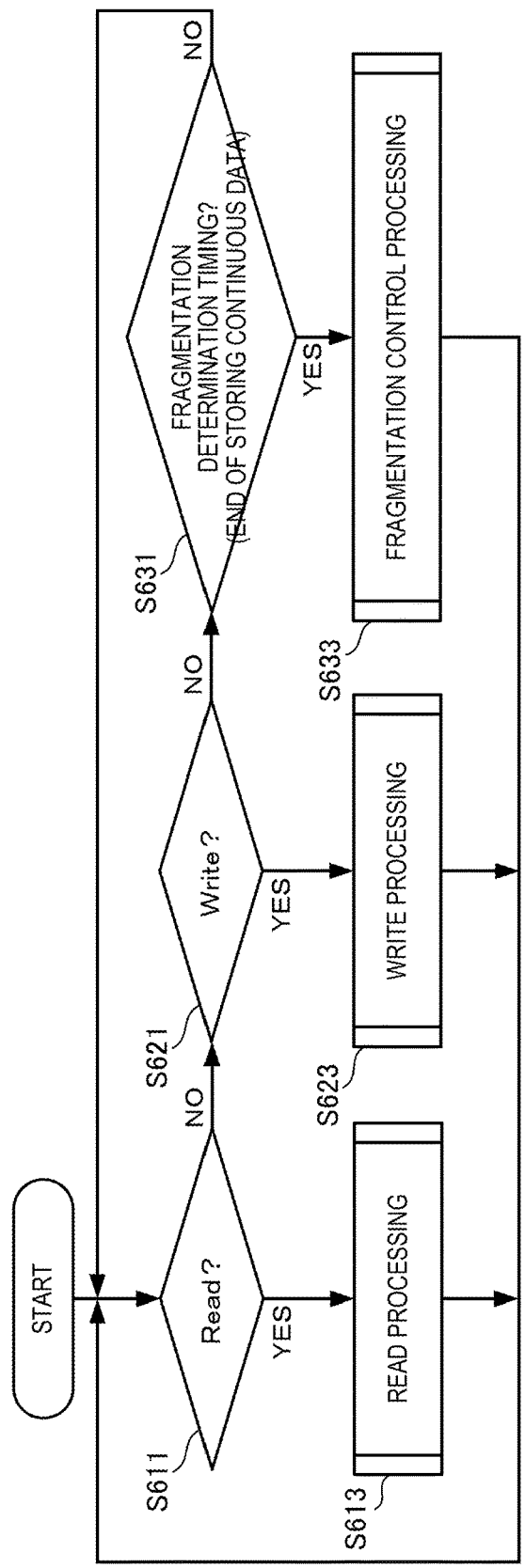
FIG. 6 is a flowchart illustrating the processing procedure of the storage controller according to the second example embodiment of the present invention.

FIG. 6 is a flowchart illustrating the processing procedure of the storage controller 220 according to this example embodiment. This flowchart is executed by the CPU 510 of FIG. 5 using the RAM 540, thereby implementing the functional components shown in FIGS. 3A and 3B.

In step S611, the storage controller 220 of the host computer 210 determines whether a read request has been received from the OS 211 or application 212. If a read request has been received, the storage controller 220 executes, in step S613, read processing from the storage medium 240; otherwise, the storage controller 220 determines in step S621 whether a write request has been received from the OS 211 or application 212. If a write request has been received, the storage controller 220 executes, in step S623, write processing in the storage medium 240. If neither a read request nor a write request has been received, the storage controller 220 determines in step S631 whether the selected fragmentation determination timing has come. If the selected fragmentation determination timing has come, the storage controller 220 executes fragmentation control processing in step S633.

(Read Processing)

Figure 7:
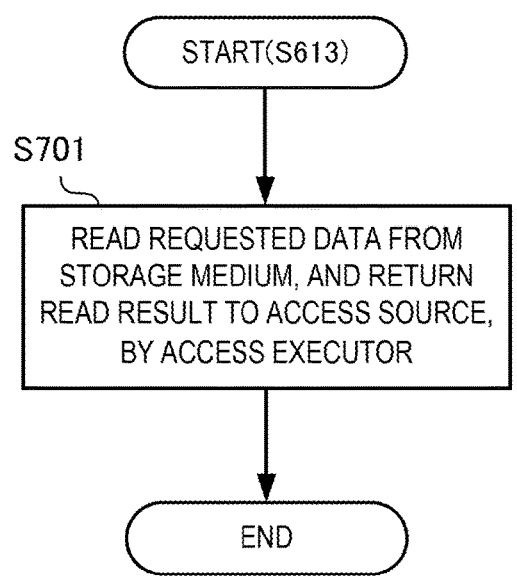
FIG. 7 is a flowchart illustrating the procedure of read processing according to the second example embodiment of the present invention.

FIG. 7 is a flowchart illustrating the procedure of the read processing (step S613) according to this example embodiment. FIG. 7 shows a procedure of, in step S613 of FIG. 6, receiving a read request from the OS and returning requested data.

Upon receiving a read request from the software or OS operating on the host computer 210, the access executor 310 of the storage controller 220 reads data from a request destination address in the storage medium 240, and returns a read result to the software or OS as an access source, thereby ending the process (step S701).

(Write Processing)

Figure 8A:
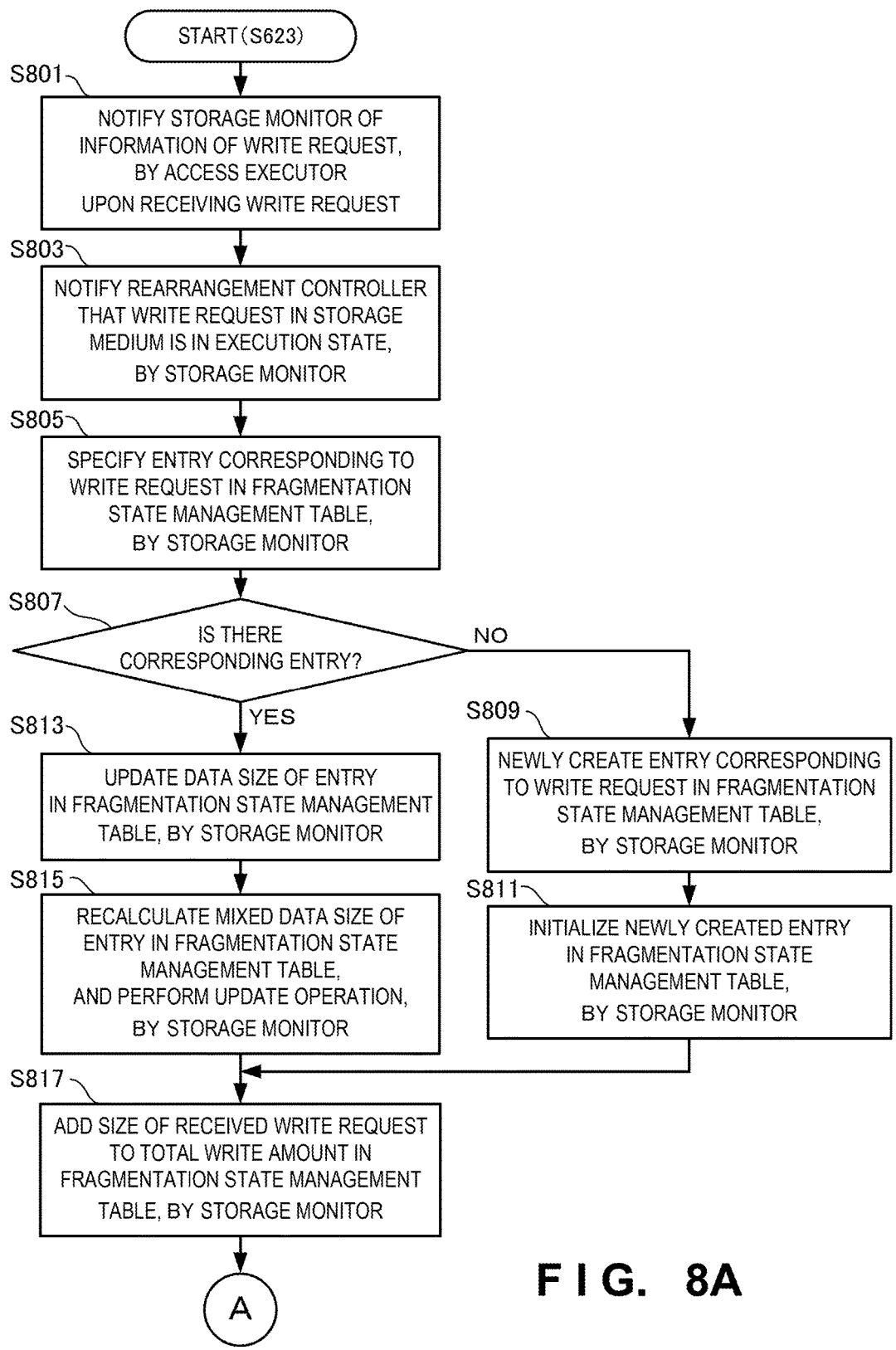
FIG. 8A is a flowchart illustrating the procedure of write processing according to the second example embodiment of the present invention.
Figure 8B:
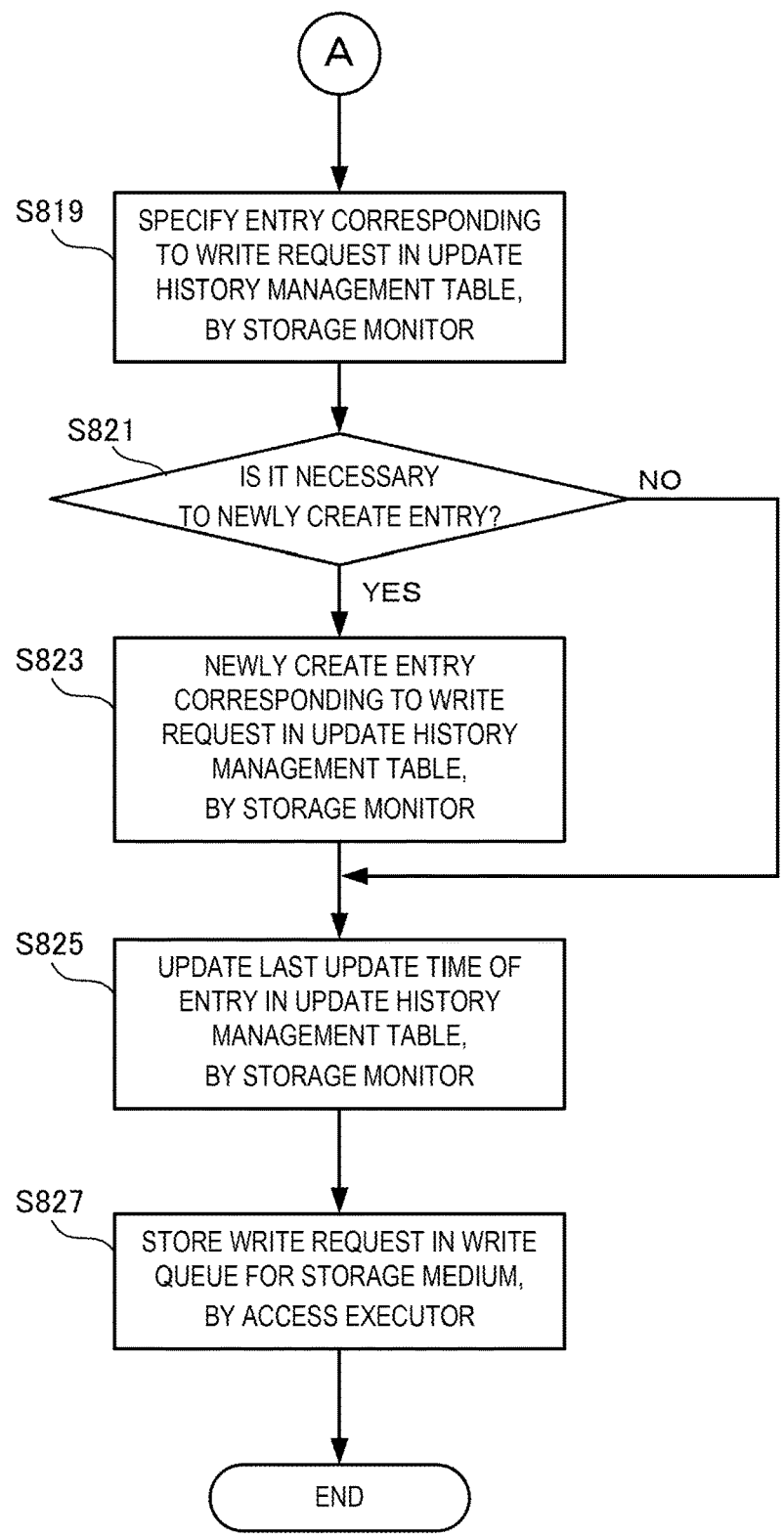
FIG. 8B is a flowchart illustrating the procedure of the write processing according to the second example embodiment of the present invention.

FIGS. 8A and 8B are flowcharts illustrating the procedure of the write processing (step S623) according to this example embodiment. FIGS. 8A and 8B show, for example, a procedure in step S623 of FIG. 6 from when a write request is received from the OS until the write request is stored in the write queue 311.

Upon receiving a write request from the software or OS operating on the host computer 210, the access executor 310 of the storage controller 220 notifies the storage monitor 302 of the rearrangement starter 320 of information of the write request (step S801).

The storage monitor 302 of the rearrangement starter 320 notifies the rearrangement controller 330 that the write request in the storage medium 240 is in an execution state (step S803). The storage monitor 302 specifies an entry corresponding to the write request received by the access executor 310 by performing collation with a write request destination with reference to the data identifier 421 in the fragmentation state management table 303 (step S805). If there is no entry corresponding to the write request (NO in step S807), the storage monitor 302 newly creates, in the fragmentation state management table 303, an entry corresponding to the write request received by the access executor 310 (step S809). The storage monitor 302 initializes the data size 422 of the entry created in step S809 to the size of the write request, and initializes the mixed data size 424 of the entry to "0", thereby recording the entry in the fragmentation state management table 303 (step S811). After that, processes in steps S817 and subsequent steps are executed.

If there is an entry corresponding to the write request (YES in step S807), the storage monitor 302 updates the data size 422 of the entry corresponding to the write request in the fragmentation state management table 303 to a value obtained by adding the size of the write request (step S813). The storage monitor 302 calculates the total amount of data written in the storage medium 240 after the last write operation of the same data is performed, that is, the mixed data size with reference to the write amount 423 at the time of the last storage operation and the total write amount 411 in the fragmentation state management table 303 (step S815). Note that if there is the capacity of data irrelevant to data fragmentation, the storage monitor 302 subtracts the capacity of the data from the mixed data size. For example, if the storage medium 240 is an SSD using a NAND flash as a storage element, an expected value of the number of storage areas as an erase unit included in the mixed data is obtained based on the size of storage areas as a unit when erase processing is performed for the NAND flash in the SSD. The mixed data size 424 in the fragmentation state management table 303 is set to a value obtained by subtracting the capacity of the erase unit corresponding to the obtained expected value from the mixed data size.

The storage monitor 302 adds the size of the write request received by the access executor 310 to the total write amount 411 in the fragmentation state management table 303. Furthermore, the storage monitor 302 updates, to the value of the current total write amount 411, the write amount 423 at the time of the last storage operation of the entry corresponding to the write request received by the access executor 310 in the fragmentation state management table 303 (step S817).

The storage monitor 302 specifies an entry corresponding to the write request received by the access executor 310 by performing collation with a write request destination with reference to the data identifier 431 in the update history management table 305 (step S819). If there is an entry corresponding to the write request and it is not necessary to newly create an entry (NO in step S821), processes in step S825 and subsequent steps are executed. If there is no entry corresponding to the write request and it is necessary to newly create an entry (YES in step S821), the storage monitor 302 newly creates, in the update history management table 305, an entry corresponding to the write request received by the access executor 310 (step S823).

The storage monitor 302 records "0" as the storing end flag 432 of the entry created in step S823 and the current time as the last update time 433 of the entry in the update history management table 305 (step S825). The access executor 310 stores the write request received, in step S801, from the software or OS operating on the host computer 210 in the write queue 311 for the storage medium 240, thereby ending the process (step S827).

The processes in steps S801 to S827 are performed to complete the operation of receiving the write request from the software or OS operating on the host computer 210 and storing the write request in the write queue 311. The processing order of the processes in steps S801 to S827 need not always be the order shown in FIGS. 8A and 8B. For example, the three processes in steps S801 to S817, steps S819 to S825, and step S827 may be performed at the same time or the execution order may be changed. The processing in step S803 may be performed immediately after or simultaneously with an arbitrary step of steps S805 to S817.

(Fragmentation Control Processing)

Figure 9A:
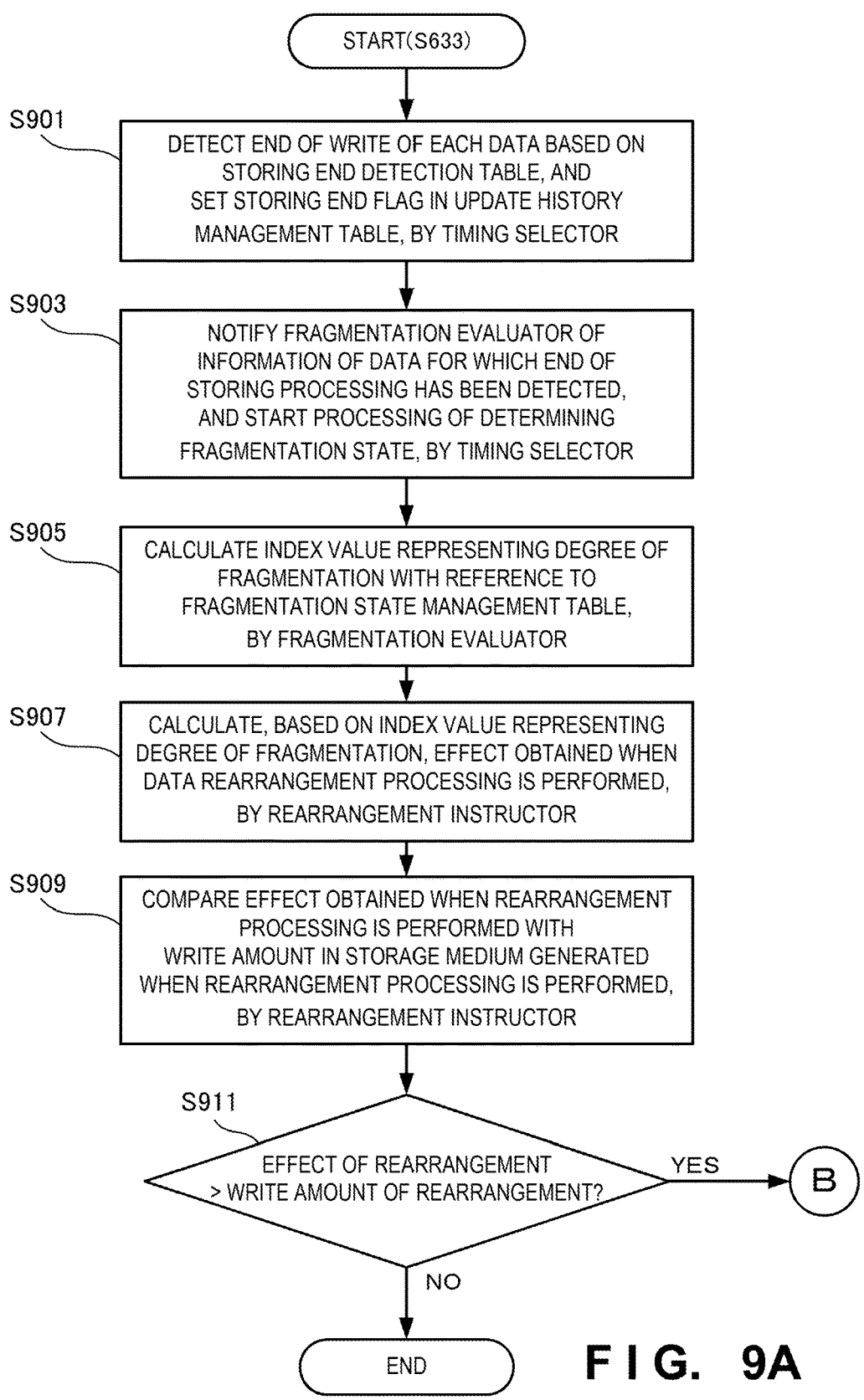
FIG. 9A is a flowchart illustrating the procedure of fragmentation control processing according to the second example embodiment of the present invention.
Figure 9B:
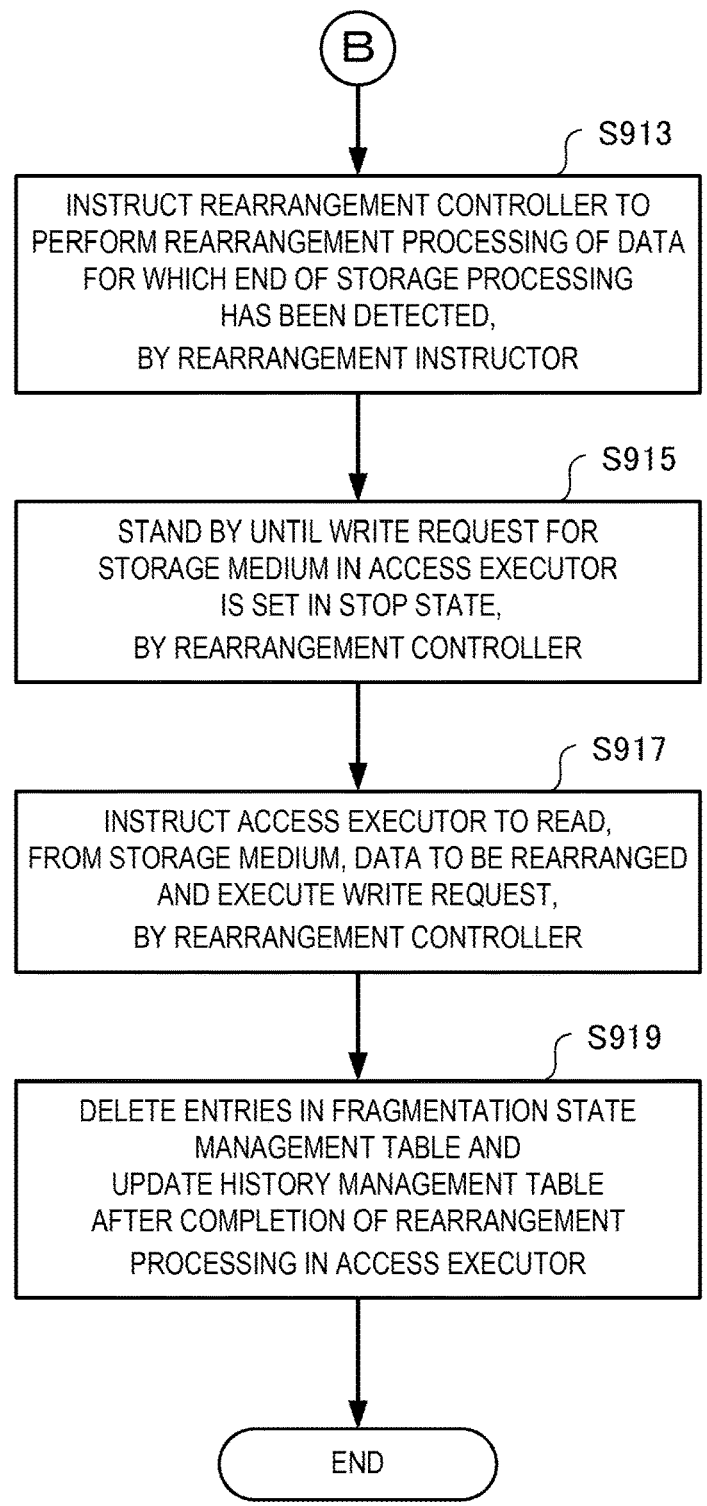
FIG. 9B is a flowchart illustrating the procedure of the fragmentation control processing according to the second example embodiment of the present invention.

FIGS. 9A and 9B are flowcharts illustrating the procedure of the fragmentation control processing (step S633) according to this example embodiment. The fragmentation control processing according to this example embodiment is a procedure of detecting the end of the storage processing of each data, determining whether rearrangement processing is necessary, and starting the rearrangement processing by the rearrangement controller 330.

The timing selector 304 of the rearrangement starter 320 determines whether the storage processing has ended, and sets "1" in the storing end flag 432 included in the corresponding entry in the update history management table 305 (step S901). For example, with reference to the storing end detection table 341, the timing selector 304 determines that the storage processing has ended when it detects that the access executor 310 receives an operation of ending the storage processing by the software or OS operating on the host computer 210. If it is determined, with reference to the last update time 433 of the entry corresponding to each data in the update history management table 305, that a predetermined time has elapsed since the last write operation, it is determined that the storage processing has ended.

The timing selector 304 notifies the fragmentation evaluator 306 of information of the data for which the end of the storing processing has been detected in step S901, and starts the processing of the fragmentation evaluator 306 (step S903). The fragmentation evaluator 306 calculates an index value representing the degree of fragmentation with reference to the data size 422 and mixed data size 424 of the entry, in the fragmentation state management table 303, corresponding to the data for which the storage processing has ended. The index value representing the degree of fragmentation is obtained by, for example, a ratio M/(D+M) of the mixed data size where D represents the referred data size 422 and M represents the referred mixed data size 424 (step S905).

The rearrangement instructor 307 calculates the effect obtained when data rearrangement processing is performed, using the rearrangement evaluation table 371 based on the index value representing the degree of fragmentation obtained by the fragmentation evaluator 306 in step S905 (step S907). The effect of the rearrangement processing is represented as a reduction amount related to the total size of the data moved in GC in the storage medium 240 by rearranging the data during a period until the data is updated or deleted. The rearrangement instructor 307 calculates an expected value related to the total size of the data moved in GC by the product of the data size and the expected value of the number of times of collection performed in GC during the period until the data is updated or deleted by assuming the data size 422 as the data amount moved by one GC operation. Note that the expected value of the number of times of collection performed in GC is calculated in consideration of the time until the data is updated or deleted and the index value representing the degree of fragmentation obtained in step S905. That is, when E represents the expected value of the total size obtained when the rearrangement processing is performed and E0 represents the expected value of the total size obtained when no rearrangement processing is performed, the rearrangement instructor 307 can calculate the effect obtained when the data rearrangement processing is performed, by the difference between the expected values of the total sizes, that is, (E0−E). Furthermore, assuming that the data moving amount in GC becomes "0" by the rearrangement processing, E0 can be calculated as the effect of the rearrangement processing.

The rearrangement instructor 307 compares the effect of the data rearrangement processing obtained in step S907 with the data write amount in the storage medium 240 generated by the rearrangement processing (step S909). More specifically, the magnitude of (E0−E) as the reduction amount of the data moving amount in GC in the storage medium 240 is compared with that of the write size D in the storage medium 240 generated by rearranging the data.

If the effect of the rearrangement processing related to the data for which the end of the storage processing has been detected in step S901 is not larger than the write amount in the storage medium 240 generated by the rearrangement processing (NO in step S911), the rearrangement instructor 307 ends the process without instructing to start the rearrangement processing.

If the effect of the rearrangement processing related to the data for which the end of the storage processing has been detected in step S901 is larger than the write amount in the storage medium 240 generated by the rearrangement processing (YES in step S911), the rearrangement instructor 307 instructs the rearrangement controller 330 to perform the rearrangement processing of the data for which the end of the storage processing has been detected (step S913). The rearrangement controller 330 inquires of the storage monitor 302, and stands by until the write request for the storage medium 240 is set in a stop state (step S915). The rearrangement controller 330 instructs the access executor 310 to execute a read request to read, from the storage medium 240, the data for which the end of the storage processing has been detected in step S901, and a write request necessary for rearrangement (step S917). The access executor 310 preferentially executes the write request for rearrangement instructed from the rearrangement controller 330 without intervention of the write queue 311 unless the rearrangement controller 330 issues an interrupt, cancel, or temporary stop instruction.

If the access executor 310 completes all of the read requests and write requests instructed in step S917, the entries corresponding to the rearrangement processing in the fragmentation state management table 303 and the update history management table 305 are deleted via the storage monitor 302, thereby ending the rearrangement processing (step S919).

The processes in steps S901 to S919 are performed to complete the operation of detecting the end of the storage processing of each data, determining whether the rearrangement processing is necessary, and starting the rearrangement processing by the rearrangement controller 330. The processing order of the processes in steps S901 to S919 need not always be the order shown in FIGS. 9A and 9B. For example, the processing in step S901 may be executed simultaneously with the processes in step S903 and subsequent steps, or executed by changing the order. Furthermore, in steps S907 and S909, the data fragmentation state is evaluated based on the expected value of the write data amount in the storage medium 240 reduced by the rearrangement processing. However, for example, comparison with the predetermined reference value of fragmentation may be performed using the index value representing the degree of fragmentation of each data obtained in step S905. In addition, in step S917, only the read operation of reading, from the storage medium, the data to be rearranged, which is instructed by the rearrangement controller, may be executed immediately after step S913. Furthermore, the delete operation of the entry in the update history management table 305 in step S919 may be executed at an arbitrary timing after step S903.

According to this example embodiment, it is possible to improve the access performance of a storage medium and prolong the life of the storage medium while frequent occurrence of rearrangement processing is suppressed in consideration of an appropriate timing of starting the rearrangement processing for reducing fragmentation in a plurality of physical address areas, thereby suppressing an increase in fragmentation and a delay in normal write processing. That is, for a set of data fragmented and stored in the internal NAND flash when simultaneously stored in the SSD, rearrangement processing is performed by selecting an appropriate set of data and an appropriate timing. This makes it possible to effectively reduce the amount of the set of data to be moved by GC processing in the SSD, and improve the effect of the improvement of the performance of the SSD and the prolongation of the life of the SSD obtained by rearrangement.

Third Example Embodiment

An information processing system including a storage control apparatus as a storage controller in a host computer according to the third example embodiment of the present invention will be described next. The information processing system according to this example embodiment is different from that according to the second example embodiment in that if the storage control apparatus receives a new write request by software or an OS operating on a host computer during rearrangement processing for defragmentation, it is determined whether to cancel or interrupt the rearrangement processing. The remaining components and operations are the same as those in the second example embodiment. Hence, the same reference numerals denote the same components and operations, and a detailed description thereof will be omitted.

It is necessary to continuously rearrange data in the SSD without writing data other than the data to be rearranged. If write data from the outside is stored during the rearrangement processing of the data in the SSD, the write data from the outside fragments the data currently undergoing the rearrangement processing, thereby decreasing the effect of reducing the data moving amount in GC by rearrangement. If, however, the write request from the outside during the rearrangement processing is simply stopped to prevent the effect of rearrangement from decreasing, the performance degrades. If a new write request is received from the host computer during the rearrangement processing for reducing fragmentation, a response to the write request is delayed to cause a write error. To prevent these problems from arising as much as possible, it is necessary to avoid a situation in which the write request from the outside of the SSD and the rearrangement processing are simultaneously performed.

Note that in this example embodiment, a write request stored in a write queue 311 is executed by a write request execution instruction from a rearrangement controller 330.

<<Functional Arrangement of Storage Control Apparatus>>

The functional arrangement of a storage controller 1020 serving as a storage control apparatus according to this example embodiment is the same as that shown in FIG. 3A. In this example embodiment, however, if the rearrangement controller 330 receives a new write request by software or an OS operating on a host computer 1210 during rearrangement processing, it is determined whether to cancel or interrupt the rearrangement processing. Note that in this example embodiment, the arrangement of the rearrangement starter 320 is not limited to that according to the second example embodiment, and any arrangement for instructing to start rearrangement under a predetermined fragmentation condition may be adopted.

(Rearrangement Controller)

Figure 10:
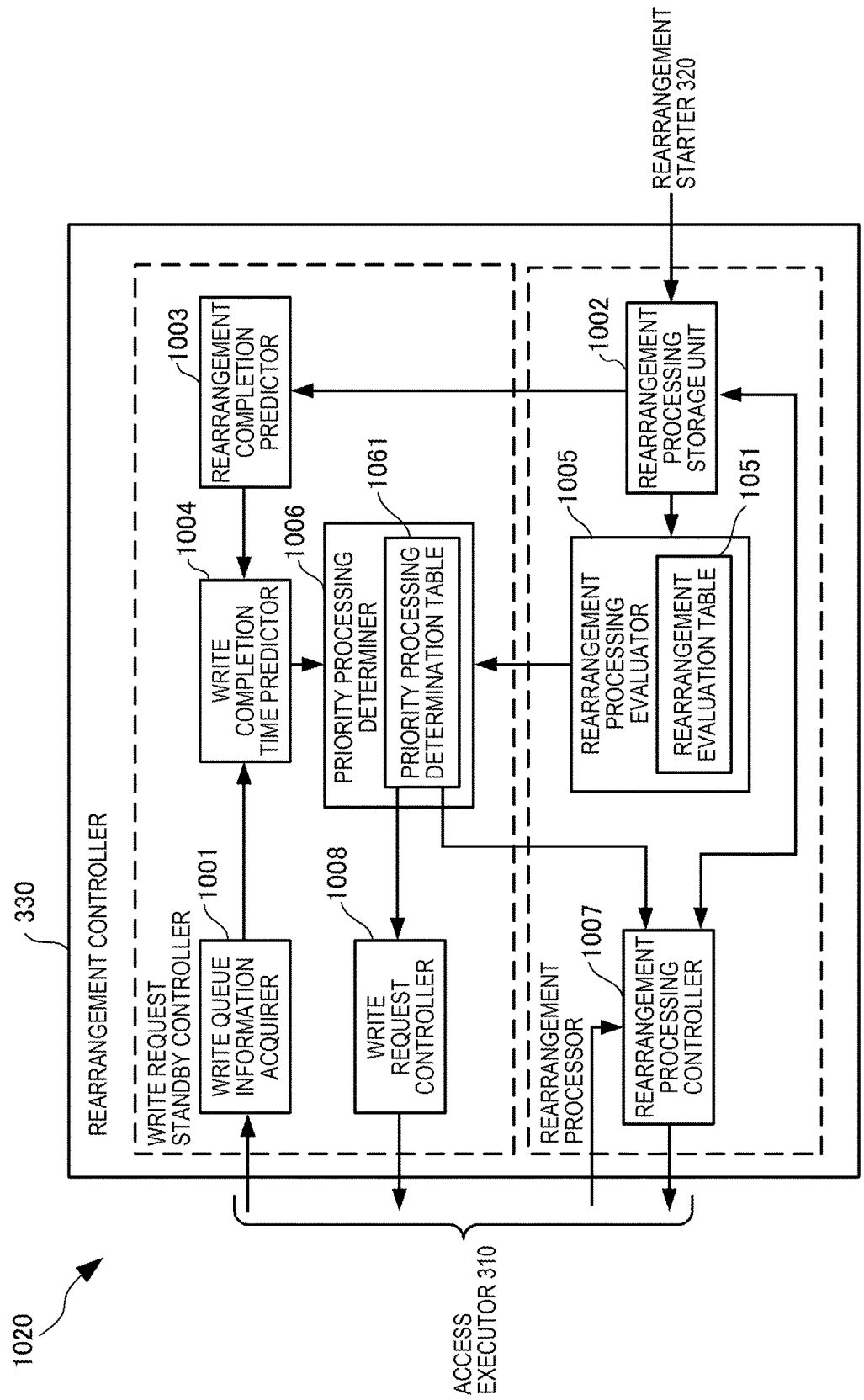
FIG. 10 is a block diagram showing the functional arrangement of a rearrangement controller according to the third example embodiment of the present invention.

FIG. 10 is a block diagram showing the functional arrangement of the rearrangement controller 330 according to this example embodiment.

The rearrangement controller 330 includes a write queue information acquirer 1001, a rearrangement processing storage unit 1002, a rearrangement completion predictor 1003, and a write completion time predictor 1004. The rearrangement controller 330 also includes a rearrangement processing evaluator 1005, a priority processing determiner 1006, a rearrangement processing controller 1007, and a write request controller 1008.

The write queue information acquirer 1001 acquires information in the write queue 311 from an access executor 310. The rearrangement processing storage unit 1002 stores information of data for which the rearrangement starter 320 has instructed to start rearrangement processing. The rearrangement completion predictor 1003 predicts the completion time of the currently executed rearrangement processing. The write completion time predictor 1004 predicts the completion time of all write requests based on the completion time of the currently executed rearrangement processing and the predicted processing times of write requests held in the write queue 311.

The rearrangement processing evaluator 1005 includes a rearrangement evaluation table 1051 similar to the rearrangement evaluation table 371 of the rearrangement instructor 307, and evaluates the effect of the currently executed rearrangement processing. The priority processing determiner 1006 includes a priority processing determination table 1061, and determines, with reference to the last processing time in the write queue 311 predicted by the write completion time predictor 1004 and the effect of the currently executed rearrangement processing evaluated by the rearrangement processing evaluator 1005, whether to maintain, or cancel or interrupt the currently executed rearrangement processing.

The rearrangement processing controller 1007 instructs the access executor 310 to start rearrangement based on the information of the data stored in the rearrangement processing storage unit 1002. If a new write request is received during the rearrangement processing, the rearrangement processing controller 1007 instructs, in accordance with the determination result of the priority processing determiner 1006, the access executor 310 to maintain, or cancel or interrupt the rearrangement processing. If a new write request is received during the rearrangement processing, the write request controller 1008 instructs, in accordance with the determination result of the priority processing determiner 1006, the access executor 310 to stand by until the rearrangement processing of the write request is completed or execute the write request after the rearrangement processing is canceled or interrupted.

(Another Functional Arrangement Example)

For example, the rearrangement controller 330 is considered to function as a write request standby controller and a rearrangement processor, both of which are shown in FIG. 10. In this case, processing by the write request standby controller and rearrangement processor is as follows.

The rearrangement processor instructs the access executor 310 to issue a read request to read, from a storage medium 240, data instructed to be rearranged. In addition, the rearrangement processor performs rearrangement processing by instructing the access executor 310 to issue a write request to rearrange the data read by the read request in the storage medium 240. Data can be read from the storage medium 240 by issuing a request to a cache memory (not shown) for the storage medium 240, instead of directly issuing a read request to the storage medium 240.

For a write request of the data issued to the storage medium 240 by the software or OS operating on the host computer 1210 while the rearrangement processor executes the rearrangement processing of the data, the write request standby controller controls execution of the write request that stands by in the write queue 311 of the access executor 310. Based on the predicted completion time of the rearrangement processing, the write request standby controller predicts completion time when the write request in the standby state is executed immediately after the rearrangement processing. If the response time of the write request calculated from the predicted completion time exceeds a predetermined reference value, the write request standby controller sequentially executes the write requests in the standby state for the storage medium 240 until the response time of the write request in the standby state in the write queue 311 becomes equal to or smaller than the predetermined reference value. If execution of the write request in the standby state is restarted before the rearrangement processing is completed, the write request standby controller recalculates the effect of the rearrangement processing in consideration of the write request, execution of which has been restarted. If the effect of the rearrangement processing is smaller than the predetermined reference value, the write request standby controller cancels the currently executed rearrangement processing via the rearrangement processor.

(Rearrangement Evaluation Table)

FIG. 11A is a table showing the structure of the rearrangement evaluation table 1051 according to this example embodiment. The rearrangement evaluation table 1051 is used by the rearrangement processing evaluator 1005 to evaluate the effect of the currently executed rearrangement processing. Note that in FIG. 11A, the same reference numerals as those in FIG. 4E denote the same elements and a description thereof will be omitted.

The rearrangement evaluation table 1051 stores "1" (if A−B<0) or "0" (if A−B≥0) as a second condition 1167 for determining whether the write request stands by or is executed, and the rearrangement processing is maintained or canceled.

(Priority Processing Determination Table)

Figure 11B:
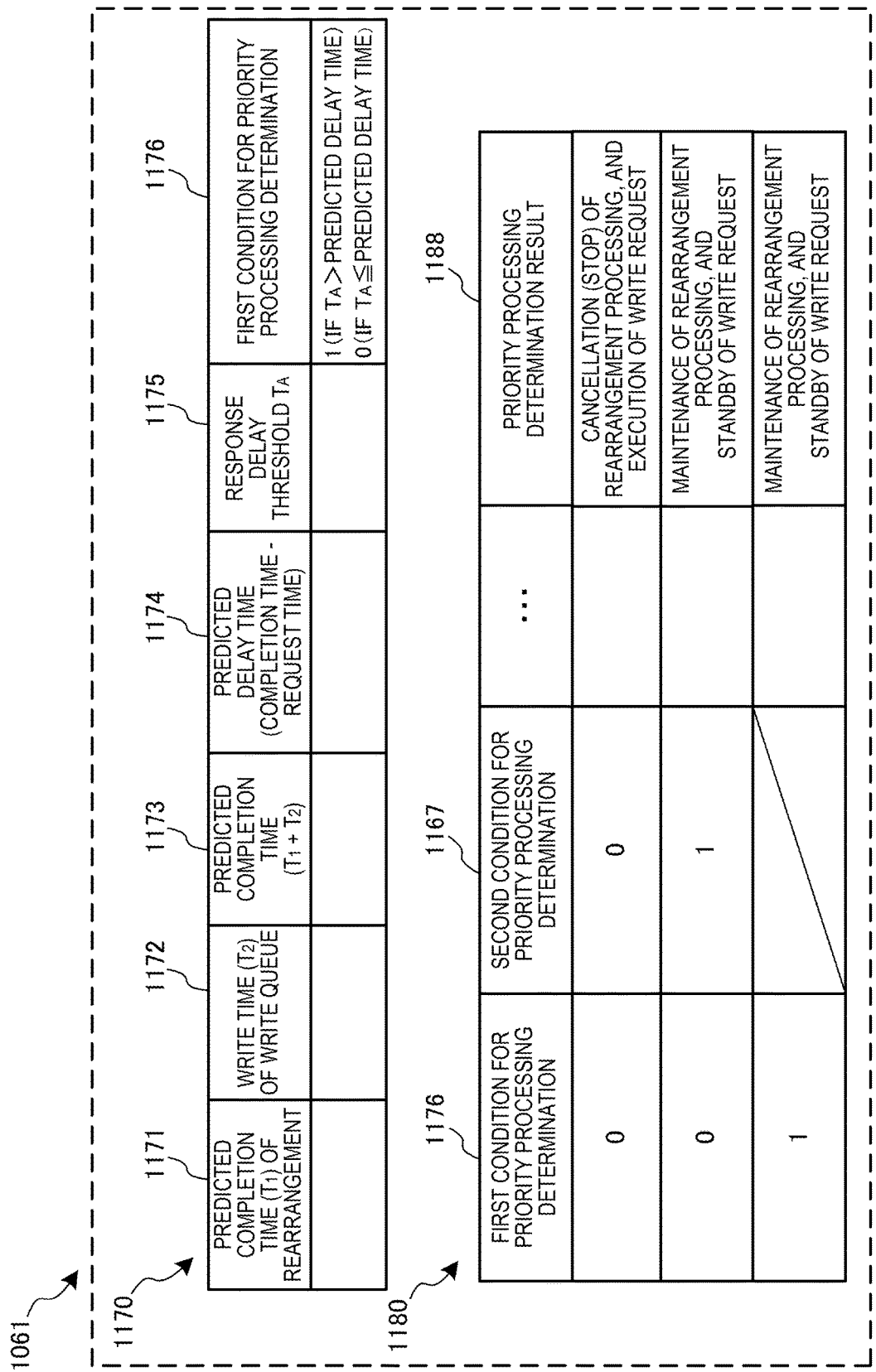
FIG. 11B is a view showing the structure of a priority processing determination table according to the third example embodiment of the present invention.

FIG. 11B is a view showing the structure of the priority processing determination table 1061 according to this example embodiment. The priority processing determination table 1061 is used by the priority processing determiner 1006 to determine, with reference to the last predicted processing time in the write queue 311 and the effect of the currently executed rearrangement processing, whether to maintain, or cancel or interrupt the currently executed rearrangement processing. Note that the priority processing determination table 1061 also shows calculation of the last predicted processing time in the write queue 311.

The priority processing determination table 1061 includes a first condition table 1170 for deriving the first condition based on the response delay of the write request from the software or OS operating on the host computer 1210, and a determination table 1180 for determining whether to maintain, or cancel or interrupt the currently executed rearrangement processing.

The first condition table 1170 stores a predicted completion time ($T_1$) 1171 of currently executed rearrangement, a write time ($T_2$) 1172 of all the write requests in the write queue 311, and predicted completion time ($T_1+T_2$) 1173 at which the last write operation in the write queue 311 is completed. The first condition table 1170 also stores a predicted delay time 1174 as the difference between the last write request time in the write queue 311 and the write completion time, and a response delay threshold $T_A$ 1175. In addition, the first condition table 1170 stores "1" (if $T_A$>predicted delay time) or "0" (if $T_A$≤predicted delay time) as a first condition 1176 for priority processing determination.

The determination table 1180 stores the first condition 1176 for priority processing determination, the second condition 1167 for priority processing determination, and a priority processing determination result 1188 based on the first condition 1176 and the second condition 1167. The priority processing determination result 1188 stores a result of determining whether the write request stands by or is executed, and whether the rearrangement processing is maintained or canceled.

<<Hardware Arrangement of Host Computer>>

Figure 12:
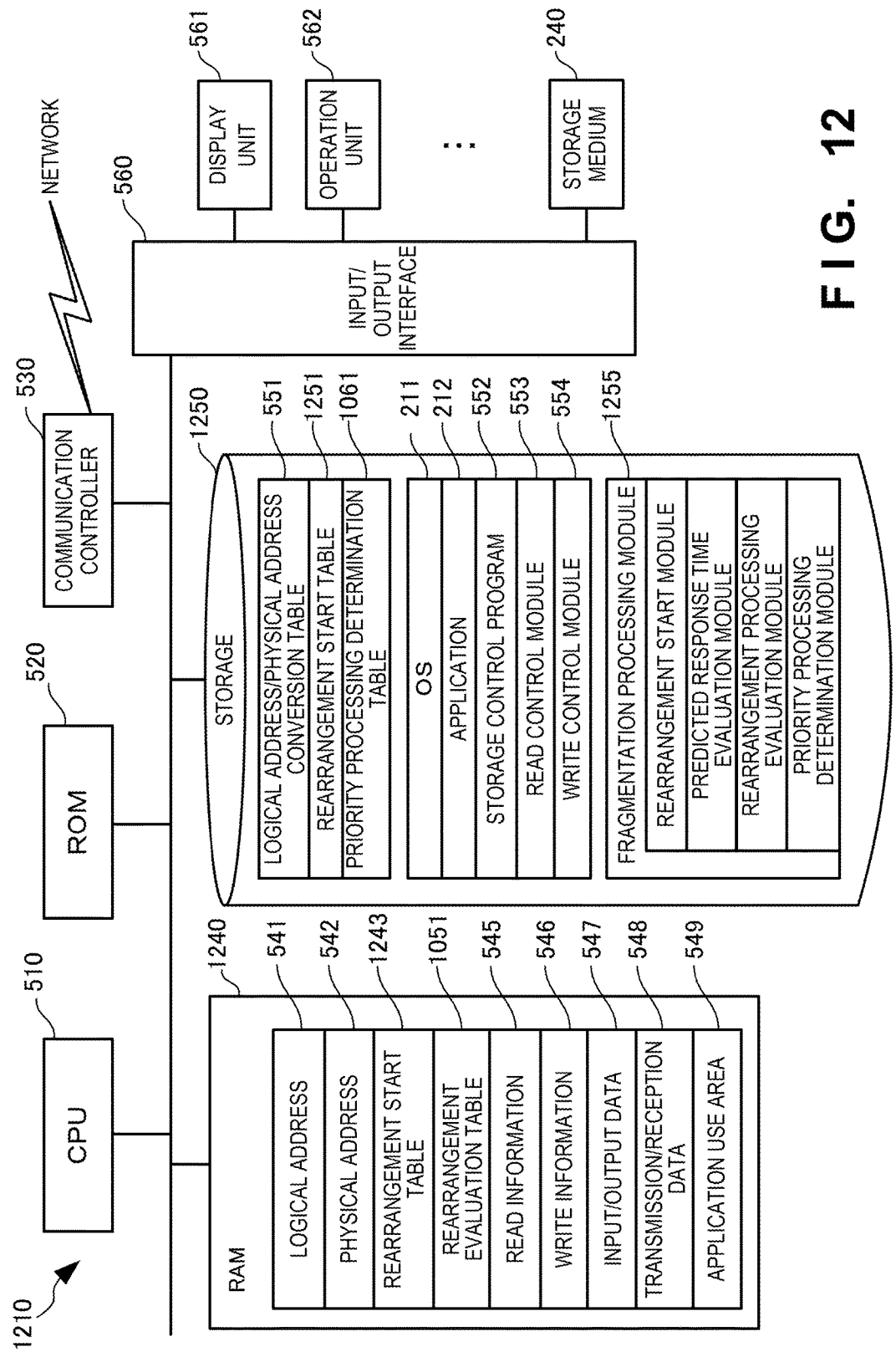
FIG. 12 is a block diagram showing the hardware arrangement of a host computer including a storage controller according to the third example embodiment of the present invention.

FIG. 12 is a block diagram showing the hardware arrangement of the host computer 1210 including the storage controller 1020 according to this example embodiment. Note that in FIG. 12, the same reference numerals as those in FIG. 5 denote the same components and a description thereof will be omitted. In FIG. 12, illustration of the tables and modules used in the second example embodiment is simplified or omitted.

A RAM 1240 stores a rearrangement start table 1243 and the rearrangement evaluation table 1051. A storage 1250 stores a rearrangement start table 1251 and the priority processing determination table 1061.

In addition, the storage 1250 stores a fragmentation processing module 1255 according to this example embodiment. The fragmentation processing module 1255 includes a rearrangement start module, a predicted response time evaluation module, a rearrangement processing evaluation module, and a priority processing determination module.

(Write Request Processing During Rearrangement)

Figure 13B:
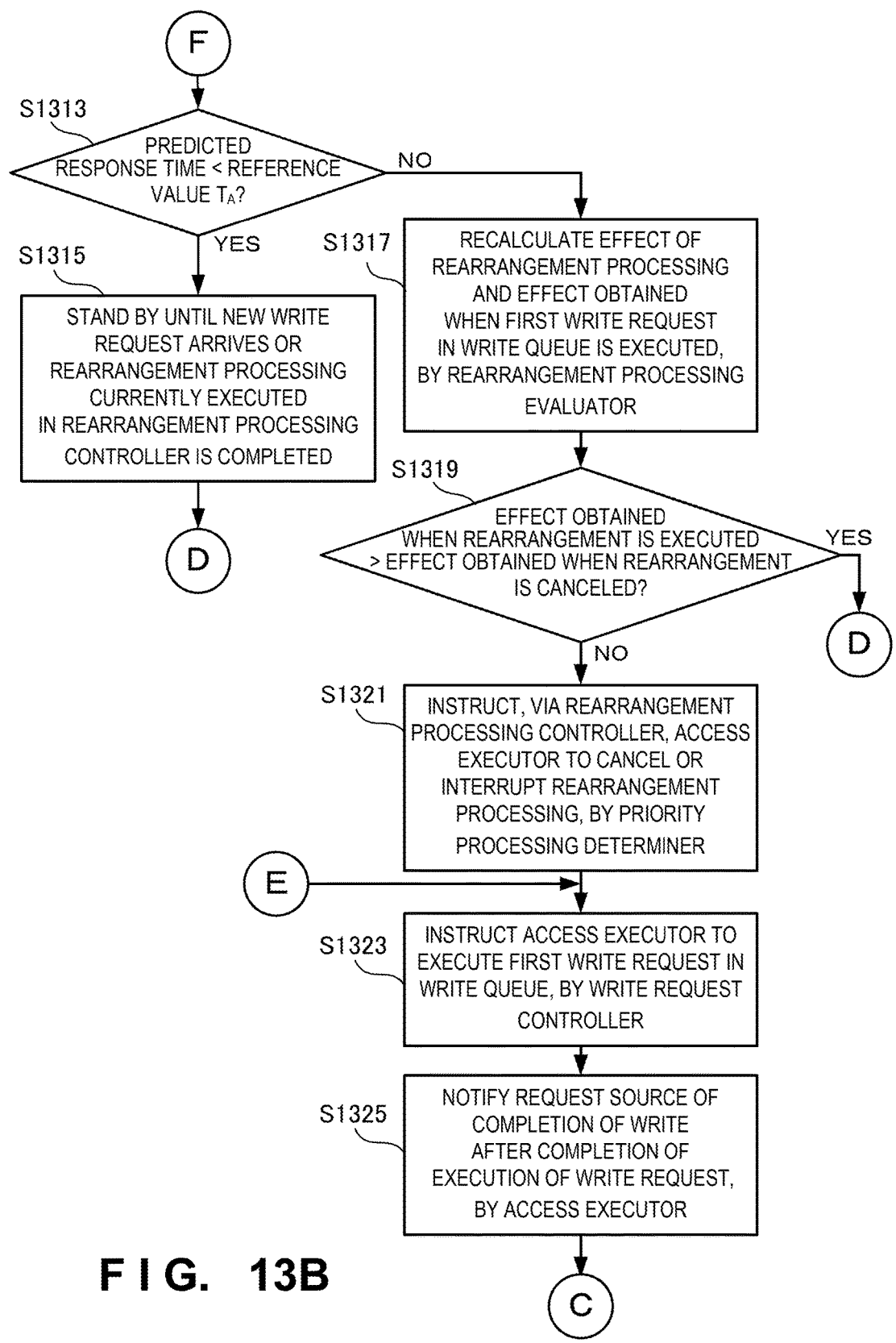
FIG. 13B is a flowchart illustrating the processing procedure for the write request during rearrangement in the storage controller according to the third example embodiment of the present invention.

FIGS. 13A and 13B are flowcharts illustrating a processing procedure for a write request during rearrangement in the storage controller 1020 according to this example embodiment. These flowcharts are executed by a CPU 510 of FIG. 12 using the RAM 1240, thereby implementing the functional components shown in FIG. 10.

If no write request is stored in the write queue 311 of the access executor 310, the write queue information acquirer 1001 included in the write request standby controller of the rearrangement controller 330 stands by until a write request is stored (step S1301). The rearrangement processing storage unit 1002 included in the rearrangement processor of the rearrangement controller 330 confirms whether the rearrangement controller 330 currently executes rearrangement processing (step S1303). If the rearrangement controller 330 does not currently execute rearrangement processing (NO in step S1305), processes in step S1323 and subsequent steps are executed.

If the rearrangement controller 330 currently executes rearrangement processing (YES in step S1305), the write completion time predictor 1004 receives the predicted completion time ($T_1$) of the rearrangement processing from the rearrangement completion predictor 1003 (step S1307). For the write requests standing by in the write queue 311 of the access executor 310, the write completion time predictor 1004 calculates, with reference to information of an access size, the predicted completion time ($T_1+T_2$) when all the write requests are executed immediately after the rearrangement processing currently executed in the rearrangement controller 330 is completed (step S1309).

The priority processing determiner 1006 calculates a predicted response time related to the last write request based on the predicted completion time ($T_1+T_2$) calculated in step S1309 and time at which the last write request standing by in the write queue 311 is requested (step S1311). If the predicted response time of the last write request is smaller than the predetermined reference time ($T_A$) (YES in step S1313), the priority processing determiner 1006 stands by until a new write request arrives or the rearrangement processing currently executed in the rearrangement controller 330 is completed (step S1315), and then executes processes in step S1303 and subsequent steps.

If the predicted response time of the last write request is not smaller than the predetermined reference time ($T_A$) (NO in step S1313), the rearrangement processing evaluator 1005 recalculates the effect of the rearrangement processing currently executed in the rearrangement controller 330 when the first write request stored in the write queue 311 is processed, in the same procedure as that shown in steps S905 to S909 of FIG. 9A (step S1317). If the effect of the rearrangement processing calculated in step S1317 exceeds the effect obtained when the rearrangement processing is stopped (YES in step S1319), processes in step S1303 and subsequent steps are executed.

If the effect of the rearrangement processing calculated in step S1317 does not exceed the effect obtained when the rearrangement processing is stopped (NO in step S1319), the priority processing determiner 1006 instructs, via the rearrangement processing controller 1007, the access executor 310 to cancel the rearrangement processing. Then, the access executor 310 interrupts read processing or write processing corresponding to the currently executed rearrangement processing, thereby canceling the rearrangement processing (step S1321).

The priority processing determiner 1006 instructs, via the write request controller 1008, the access executor 310 to execute the first write request standing by in the write queue 311, and the access executor 310 executes the write request for the storage medium 240 (step S1323). The access executor 310 notifies the software or OS operating on the host computer 1210 as a request source of a completion response to the write request executed in step S1323, and executes processes in step S1301 and subsequent steps (step S1325).

The processes in steps S1301 to S1325 are executed to complete the operation of executing, via the access executor 310, the write request for the storage medium 240 from the software or OS operating on the host computer 1210, that is stored in the write queue 311. The operation of canceling the rearrangement processing in step S1321 may be an operation of temporarily interrupting the rearrangement processing and restarting the interrupted rearrangement processing after execution of the write request standing by in the write queue 311 is completed. In this case, as for recalculation of the effect of the rearrangement processing in step S1317, the effect obtained when the rearrangement processing is temporarily interrupted is additionally calculated. The operation in step S1307 in which the write completion time predictor 1004 receives the predicted completion time of the rearrangement processing from the rearrangement completion predictor 1003 may be an operation in which the write completion time predictor 1004 or the priority processing determiner 1006 directly calculates the predicted completion time with reference to the fragmentation state management table 303.

According to this example embodiment, it is possible to improve the access performance of a storage medium and prolong the life of the storage medium, and prevent a situation in which a response to the write request is delayed to cause a write error, by determining, when a new write request is received from the host computer during the rearrangement processing for reducing fragmentation, whether to maintain, or cancel or interrupt the rearrangement processing. That is, for a set of data fragmented and stored in the internal NAND flash when simultaneously stored in the SSD, rearrangement processing is performed by selecting an appropriate set of data and an appropriate timing. This makes it possible to effectively reduce the amount of the set of data to be moved by GC processing in the SSD, and improve the effect of the improvement of the performance of the SSD and the prolongation of the life of the SSD obtained by rearrangement.

Fourth Example Embodiment

An information processing system including a storage control apparatus as a storage controller in a host computer according to the fourth example embodiment of the present invention will be described next. The information processing system according to this example embodiment is the same as those according to the second and third example embodiments except for the timing of starting rearrangement processing and execution of write request processing during the rearrangement processing. The remaining components and operations are the same as those in the second and third example embodiments. Hence, the same reference numerals denote the same components and operations, and a detailed description thereof will be omitted.

<<Functional Arrangement of Storage Control Apparatus>>

FIG. 14 is a block diagram showing the functional arrangement of a storage controller 1420 serving as a storage control apparatus according to this example embodiment. Note that in FIG. 14, the same reference numerals as those in FIGS. 3B and 10 denote the same functional components and a description thereof will be omitted.

In the storage controller 1420, a storage monitor 302 and rearrangement instructor 307 of a rearrangement starter 320 are connected to a rearrangement processing storage unit 1002 of a rearrangement controller 330. Note that FIG. 14 does not show any tables held by the functional components but the same tables as in FIGS. 3B and 10 are held.

According to this example embodiment, it is possible to improve the access performance of a storage medium and prolong the life of the storage medium while frequent occurrence of rearrangement processing is suppressed in consideration of an appropriate timing of starting the rearrangement processing for reducing fragmentation in a plurality of physical address areas, thereby suppressing an increase in fragmentation and a delay in normal write processing. Furthermore, it is possible to prevent a situation in which a response to the write request is delayed to cause a write error, by determining, when a new write request is received from the host computer during the rearrangement processing for reducing fragmentation, whether to maintain, or cancel or interrupt the rearrangement processing. That is, for a set of data fragmented and stored in the internal NAND flash when simultaneously stored in the SSD, rearrangement processing is performed by selecting an appropriate set of data and an appropriate timing. This makes it possible to effectively reduce the amount of the set of data to be moved by GC processing in the SSD, and improve the effect of the improvement of the performance of the SSD and the prolongation of the life of the SSD obtained by rearrangement.

Fifth Example Embodiment

An information processing system including a storage control apparatus as a storage controller in a host computer according to the fifth example embodiment of the present invention will be described next. The information processing system according to this example embodiment is different from those according to the second to fourth example embodiments in that a buffer to be substituted for write processing in an area that is evaluated as an area in which fragmentation is significant is provided. The remaining components and operations are the same as those in the second to fourth example embodiments. Hence, the same reference numerals denote the same components and operations, and a detailed description thereof will be omitted.

<<Information Processing System>>

FIG. 15 is a view showing the arrangement of an information processing system 1500 according to this example embodiment. Note that in FIG. 15, the same reference numerals as those in FIG. 2 denote the same functional components and a description thereof will be omitted.

The information processing system 1500 shown in FIG. 15 includes a buffer 1560. The buffer 1560 stores data corresponding to a write request for an area having a high fragmentation frequency among write data in a storage medium 240. Similarly to the storage medium 240, an SSD can be used as the buffer 1560, instead of using a storage medium such as a DRAM (Dynamic Random Access Memory) having performance higher than that of the storage medium 240. A partial area of the storage medium 240 may be assigned as the buffer 1560.

A host computer 1510 includes a storage controller 1520 that controls write processing in the storage medium 240 or the buffer 1560 in addition to the processing according to the second to fourth example embodiments. The storage controller 1520 is substituted for write processing in an area that is evaluated as an area in which fragmentation is significant by primarily saving the write processing in the buffer 1560, and reduces the write count in the storage medium 240, thereby preventing an increase in fragmentation.

According to this example embodiment, it is possible to improve the access performance of a storage medium and prolong the life of the storage medium. Storage of write data in an area estimated in advance to have a high fragmentation occurrence frequency is avoided by storing, in a memory area prepared as a buffer, write data for an area having a high fragmentation occurrence frequency, thereby making it possible to further improve the access performance of the storage medium and prolong the life of the storage medium.

Sixth Example Embodiment

An information processing system including a storage control apparatus as a storage controller in a host computer according to the sixth example embodiment of the present invention will be described next. The information processing system according to this example embodiment is different from those according to the second to fifth example embodiments in that the storage controller is provided on the storage medium side or outside the host computer via a network. The remaining components and operations are the same as those in the second to fifth example embodiments. Hence, the same reference numerals denote the same components and operations, and a detailed description thereof will be omitted.

<<Information Processing System>>

FIG. 16 is a view showing the arrangement of an information processing system 1600 including a storage controller 1643 or 1620 according to this example embodiment. Note that in FIG. 16, the same reference numerals as those in FIG. 2 denote the same components and a description thereof will be omitted.

Referring to FIG. 16, a host computer 1610 includes no storage controller according to this example embodiment. As an example, the storage controller 1643 according to this example embodiment is mounted on a storage medium 1640. As another example, the storage controller 1620 according to this example embodiment is connected as an independent apparatus via a network 250. The storage controller 1643 or 1620 may be implemented by software or a one-chip processor.

According to this example embodiment, it is possible to improve the access performance of a storage medium and prolong the life of the storage medium. In addition, unlike the second to fifth example embodiments, without limitation to the processing by the host computer, it is possible to improve the access performance of a storage medium and prolong the life of the storage medium by estimating the fragmentation state of the area in write in the storage medium and canceling the fragmentation state by performing rearrangement.

Other Example Embodiments

While the invention has been particularly shown and described with reference to example embodiments thereof, the invention is not limited to these example embodiments. It will be understood by those of ordinary skill in the art that various changes in form and details may be made therein without departing from the spirit and scope of the present invention as defined by the claims.

The present invention is applicable to a system including a plurality of devices or a single apparatus. The present invention is also applicable even when an information processing program for implementing the functions of example embodiments is supplied to the system or apparatus directly or from a remote site. Hence, the present invention also incorporates the program installed in a computer to implement the functions of the present invention by the computer, a medium storing the program, and a WWW (World Wide Web) server that causes a user to download the program. Especially, the present invention incorporates at least a non-transitory computer readable medium storing a program that causes a computer to execute processing steps included in the above-described example embodiments.

The invention claimed is:

1. A storage control apparatus comprising:
 a fragmentation evaluator that evaluates a degree of a fragmentation to which data corresponding to a logical address area in a logical address space used by a host computer to access a storage medium is fragmented and stored in a plurality of physical address areas in a physical address space used in the storage medium;
 a timing selector that selects a timing of performing evaluation by said fragmentation evaluator; and
 a rearrangement instructor that instructs whether to execute or cancel data rearrangement processing of rearranging the data corresponding to the logical address area to be written in continuous physical address areas in the storage medium, based on the degree of the fragmentation evaluated by said fragmentation evaluator at the timing,
 wherein said fragmentation evaluator evaluates the degree of the fragmentation based on a comparison between a size of a series of data written into the storage medium by a write access operation and a size of data written into the storage medium by other write access operations different from the write access operation during a period from a start to an end of the write access operation, and
 said timing selector selects an end of the write access operation of writing the series of data as the timing.

2. The storage control apparatus according to claim 1, wherein said rearrangement instructor evaluates whether access performance to the storage medium is improved by the data rearrangement processing and, when it is evaluated that the access performance to the storage medium is improved by the data rearrangement processing, instructs execution of the data rearrangement processing.

3. The storage control apparatus according to claim 2, wherein said rearrangement instructor, when a reduction amount of a data moving amount along with internal processing of the storage medium, which is expected by executing the data rearrangement processing, exceeds a data moving amount necessary to read and write a series of data by the data rearrangement processing, evaluates that the data rearrangement processing improves the access performance to the storage medium.

4. The storage control apparatus according to claim 3, wherein the expected reduction value is calculated as a difference between an expected total size of data moved by the internal processing when the data rearrangement processing is performed and an expected total size of data moved by the internal processing when the data rearrangement processing is not performed.

5. The storage control apparatus according to claim 4, wherein the expected total size is calculated by a product of a data amount moved by performing the internal processing once and an expected number of times of collection performed by the internal processing until the data is updated or deleted, in consideration of the degree of the fragmentation evaluated by said fragmentation evaluator.

6. The storage control apparatus according to claim 3, wherein the internal processing includes garbage collection.

7. The storage control apparatus according to claim 3, further comprising a rearrangement controller that starts the data rearrangement processing instructed by said rearrangement instructor, when detecting a state in which no write is executed from the host computer,
wherein said rearrangement controller, when receiving a write request from the host computer during the data rearrangement processing, evaluates whether the data rearrangement processing improves the access performance to the storage medium, and instructs to continue the data rearrangement processing if the access performance is improved, but instructs to cancel or interrupt the data rearrangement processing if the access performance is not improved.

8. The storage control apparatus according to claim 2, further comprising a rearrangement controller that starts the data rearrangement processing instructed by said rearrangement instructor, when detecting a state in which no write is executed from the host computer.

9. The storage control apparatus according to claim 1, further comprising a rearrangement controller that starts the data rearrangement processing instructed by said rearrangement instructor, when detecting a state in which no write is executed from the host computer.

10. The storage control apparatus according to claim 9, wherein said rearrangement controller, when receiving a write request from the host computer during the data rearrangement processing, evaluates whether the data rearrangement processing improves the access performance to the storage medium, and instructs to continue the data rearrangement processing if the access performance is improved, but instructs to cancel or interrupt the data rearrangement processing if the access performance is not improved.

11. The storage control apparatus according to claim 10, further comprising a write request controller that instructs standby of the write request if the access performance is improved, but instructs execution of the write request if the access performance is not improved.

12. The storage control apparatus according to claim 1, wherein the end of the write access operation of writing the series of data is detected by a lapse of time since last write in the storage medium.

13. A storage control apparatus comprising:
a fragmentation evaluator that evaluates a degree of a fragmentation to which data corresponding to a logical address area in a logical address space used by a host computer to access a storage medium is fragmented and stored in a plurality of physical address areas in a physical address space used in the storage medium;
a timing selector that selects a timing of performing evaluation by said fragmentation evaluator; and
a rearrangement instructor that instructs whether to execute or cancel data rearrangement processing of rearranging the data corresponding to the logical address area to be written in continuous physical address areas in the storage medium, based on the degree of the fragmentation evaluated by said fragmentation evaluator at the timing,
wherein said timing selector selects an end of the write access operation of writing the series of data as the timing, and
wherein the end of the write access operation of writing the series of data is detected by one of a request to close a file including the series of data from the host computer, an instruction to end storing the series of data, and disconnection of a session or connection to the storage medium from the host computer.

14. The storage control apparatus according to claim 13, wherein said fragmentation evaluator, when the write access operation of writing the series of data ends, evaluates the degree of the fragmentation to which the series of data is fragmented and stored based on a comparison between a size of the series of data written into the storage medium by a write access operation and a size of data written into the storage medium by other write access operations different from the write access operation during a period from a start to an end of the write access operation.

15. The storage control apparatus according to claim 13, wherein said rearrangement instructor evaluates whether access performance to the storage medium is improved by the data rearrangement processing and, when it is evaluated that the access performance to the storage medium is improved by the data rearrangement processing, instructs execution of the data rearrangement processing.

16. The storage control apparatus according to claim 15, further comprising a rearrangement controller that starts the data rearrangement processing instructed by said rearrangement instructor, when detecting a state in which no write is executed from the host computer.

17. A storage control method comprising:
evaluating a degree of the fragmentation to which data corresponding to a logical address area in a logical address space used by a host computer to access a storage medium is fragmented and stored in a plurality of physical address areas in a physical address space used in the storage medium, based on a comparison between a size of a series of data written into the storage medium by a write access operation and a size of data written into the storage medium by other write access operations different from the write access operation during a period from a start to an end of the write access operation;
selecting an end of the write access operation of writing the series of data as a timing of performing evaluation in the evaluating; and
instructing whether to execute or cancel data rearrangement processing of rearranging the data corresponding to the logical address area to be written in continuous physical address areas in the storage medium, based on the degree of the fragmentation evaluated in the evaluating at the timing.

18. An information processing system comprising:
a host computer;
a storage medium; and
a storage control apparatus that controls access to said storage medium by said host computer,
said storage control apparatus including
a fragmentation evaluator that evaluates a degree of a fragmentation to which data corresponding to a logical address area in a logical address space used by said host computer to access a storage medium is fragmented and stored in a plurality of physical address areas in a physical address space used in the storage medium, a timing selector that selects a timing of performing evaluation by said fragmentation evaluator, and a rearrangement instructor that instructs whether to execute or cancel data rearrangement processing of rearranging the data corresponding to the logical address area to be written in continuous physical address areas in the storage medium, based on the degree of the fragmentation evaluated by said fragmentation evaluator at the timing, wherein said fragmentation evaluator evaluates the degree of the fragmentation based on a comparison between a size of a series of data written into the storage medium by a write access operation and a size of data written into the storage medium by other write access operations different from the write access operation during a period from a start to an end of the write access operation, and said timing selector selects an end of the write access operation of writing the series of data as the timing.

19. A storage control apparatus comprising:

a fragmentation evaluator that evaluates a degree of a fragmentation to which data corresponding to a logical address area in a logical address space used by a host computer to access a storage medium is fragmented and stored in a plurality of physical address areas in a physical address space used in the storage medium;

a timing selector that selects a timing of performing evaluation by said fragmentation evaluator; and a rearrangement instructor that instructs whether to execute or cancel data rearrangement processing of rearranging the data corresponding to the logical address area to be written in continuous physical address areas in the storage medium, based on the degree of the fragmentation evaluated by said fragmentation evaluator at the timing, wherein said rearrangement instructor evaluates whether access performance to the storage medium is improved by the data rearrangement processing and, when it is evaluated that the access performance to the storage medium is improved by the data rearrangement processing, instructs execution of the data rearrangement processing, said rearrangement instructor, when a reduction amount of a data moving amount along with internal processing of the storage medium, which is expected by executing the data rearrangement processing, exceeds a data moving amount necessary to read and write a series of data by the data rearrangement processing, evaluates that the data rearrangement processing improves the access performance to the storage medium, the expected reduction value is calculated as a difference between an expected total size of data moved by the internal processing when the data rearrangement processing is performed and an expected total size of data moved by the internal processing when the data rearrangement processing is not performed, and the expected total size is calculated by a product of a data amount moved by performing the internal processing once and an expected number of times of collection performed by the internal processing until the data is updated or deleted, in consideration of the degree of the fragmentation evaluated by said fragmentation evaluator.

20. A storage control apparatus comprising:

a fragmentation evaluator that evaluates a degree of a fragmentation to which data corresponding to a logical address area in a logical address space used by a host computer to access a storage medium is fragmented and stored in a plurality of physical address areas in a physical address space used in the storage medium;

a timing selector that selects a timing of performing evaluation by said fragmentation evaluator; and a rearrangement instructor that instructs whether to execute or cancel data rearrangement processing of rearranging the data corresponding to the logical address area to be written in continuous physical address areas in the storage medium, based on the degree of the fragmentation evaluated by said fragmentation evaluator at the timing, further comprising a rearrangement controller that starts the data rearrangement processing instructed by said rearrangement instructor, when detecting a state in which no write is executed from the host computer, wherein said rearrangement controller, when receiving a write request from the host computer during the data rearrangement processing, evaluates whether the data rearrangement processing improves access performance to the storage medium, and instructs to continue the data rearrangement processing if the access performance is improved, but instructs to cancel or interrupt the data rearrangement processing if the access performance is not improved.

* * * * *